US010965591B2

(12) United States Patent
Scott et al.

(10) Patent No.: US 10,965,591 B2
(45) Date of Patent: Mar. 30, 2021

(54) SYSTEM AND METHOD FOR NETWORK TRAFFIC PROCESSING BASED ON FEDERATED SERVICES AND USER GROUPS

(71) Applicant: THE BOEING COMPANY, Chicago, IL (US)

(72) Inventors: James P. Scott, Manhattan Beach, CA (US); Scott C. Sullivan, South Pasadena, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/431,061

(22) Filed: Jun. 4, 2019

(65) Prior Publication Data

US 2020/0389396 A1    Dec. 10, 2020

(51) Int. Cl.
*H04L 12/713* (2013.01)
*H04L 12/715* (2013.01)
(Continued)

(52) U.S. Cl.
CPC ........ *H04L 45/586* (2013.01); *H04L 12/4641* (2013.01); *H04L 12/56* (2013.01);
(Continued)

(58) Field of Classification Search
CPC ..... H04L 12/4641; H04L 45/50; H04L 45/74; H04L 45/586; H04W 40/02; H04W 48/18;
(Continued)

(56) References Cited

U.S. PATENT DOCUMENTS

| 10,333,842 B2 * | 6/2019 | Scott ................. H04L 45/26 |
| 2013/0031271 A1 * | 1/2013 | Bosch ............... H04W 40/246 |
| | | 709/245 |

(Continued)

FOREIGN PATENT DOCUMENTS

| EP | 3396906 A2 | 10/2018 |
| EP | 3396906 A3 | 1/2019 |
| EP | 3444970 A1 | 2/2019 |

OTHER PUBLICATIONS

Extended European Search Report dated Jul. 27, 2020 issued in the corresponding EP Application No. 20173301.1, pp. 1-10.

*Primary Examiner* — Kan Yuen
(74) *Attorney, Agent, or Firm* — Moore Intellectual Property Law, PLLC

(57) ABSTRACT

A system includes a first MODEM configured to generate a first data packet (including a first virtual routing and forwarding (VRF) instance identifier associated with a first service, a first user group, or both) based on a first radio-frequency (RF) signal and a second MODEM configured to generate a second data packet (including a second VRF instance identifier associated with a second service, a second user group, or both) based on a second RF signal. The system includes a network device configured to receive the first data packet, transmit a first packet (including a first header that includes a first indicator associated with a first VRF instance) to a first device via a network, receive the second data packet, and transmit a second packet (including a second header that includes a second indicator associated with a second VRF instance) to a second device via the network.

23 Claims, 8 Drawing Sheets

(51) Int. Cl.
   *H04L 12/46*     (2006.01)
   *H04L 12/54*     (2013.01)
   *H04L 12/70*     (2013.01)

(52) U.S. Cl.
   CPC .............. *H04L 45/04* (2013.01); *H04L 45/64* (2013.01); *H04L 2012/5608* (2013.01)

(58) Field of Classification Search
   CPC .... H04W 84/042; H04W 84/06; H04H 40/90; H04B 7/18513
   See application file for complete search history.

(56) References Cited

U.S. PATENT DOCUMENTS

2015/0318914 A1    11/2015  Scott et al.
2018/0309671 A1*   10/2018  Scott ..................... H04W 40/02
2019/0014040 A1*    1/2019  Yerrapureddy ......... H04L 12/28

* cited by examiner

SYSTEM AND METHOD FOR NETWORK TRAFFIC PROCESSING BASED ON FEDERATED SERVICES AND USER GROUPS

FIELD OF THE DISCLOSURE

The present disclosure is generally related to processing network traffic based on federated services and user groups.

BACKGROUND

Cellular network providers, also referred to as Tier-1 mobile network operators (MNO), are able to use cellular systems to provide telephone, data, and other services to subscribers via wireless devices, such as mobile phones, tablet computers, etc. A cellular network provider has a designated frequency spectrum (e.g., frequency range) from which the network bandwidth (measured in Hertz (Hz)) and capacity (measured in bits per second (bps)) used in providing cellular services to the subscribers is derived. This bandwidth and capacity may be larger than needed to provide the services offered by the cellular network provider. In order to increase revenue, the cellular network provider may sell a portion of the bandwidth, the capacity, and services to Tier-2 operators, also known as mobile virtual network operators (MVNOs) or virtual network operators (VNOs). In this model, the Tier-1 operator is referred to as a Value-Added Reseller (VAR) that resells bandwidth, capacity, and services that would otherwise be "stranded" (i.e., not used to provide revenue to the VAR). The cellular system is then used to provide access to designated cellular or network services to subscribers of the Tier-2 operators. Although the cellular system is able to process traffic for different Tier-2 operators, in certain systems, the traffic associated with a first Tier-2 operator and a first service is not isolated from traffic associated with a second Tier-2 operator and a second service, which can pose a potential security risk to the Tier-2 operators (e.g., a risk that traffic associated with a particular Tier-2 operator or a particular service is processed with and provided to a device associated with a different Tier-2 operator or a different service).

SUMMARY

In a particular implementation, a system for communication based on services and user groups includes a plurality of MODEMS corresponding to a plurality of MODEM pools. The plurality of MODEMS includes a first MODEM corresponding to a first MODEM pool and a second MODEM corresponding to a second MODEM pool. The first MODEM is configured to generate a first data packet based on a first radio-frequency (RF) signal. The first data packet includes first data and a first virtual routing and forwarding (VRF) instance identifier. The second MODEM is configured to generate a second data packet based on a second RF signal. The second data packet includes second data and a second VRF instance identifier. The system also includes a network device in communication with the plurality of MODEMs. The network device is configured to receive the first data packet and to transmit a first packet to a first device via a network. The first packet includes the first data and a first header that includes a first indicator. The first indicator is associated with a first VRF instance that corresponds to the first VRF instance identifier. The first VRF instance identifier is associated with a first service, a first user group, or both. The network device is further configured to receive the second data packet and to transmit a second packet to a second device via the network. The second packet includes the second data and a second header that includes a second indicator. The second indicator is associated with a second VRF instance that corresponds to the second VRF instance identifier. The second VRF instance identifier is associated with a second service, a second user group, or both.

In another particular implementation, a satellite includes a payload including one or more antennas. The satellite includes a memory configured to store channel mapping data that indicates a mapping of at least one radio frequency (RF) channel to a different RF channel. The satellite further includes a processor configured to initiate transmission of a second RF signal from the one or more antennas to a first device (e.g., a subscriber device) based on the channel mapping data, a first service associated with the first device, and a first user group associated with the first device. The second RF signal is based on a first RF signal received at the one or more antennas from radio frequency equipment (RFE). The first RF signal corresponds to a first RF channel, and the second RF signal corresponds to a second RF channel that is different from the first RF channel.

In another particular implementation, a method includes receiving a first data packet at a network device from a first MODEM of a first MODEM pool, transmitting a first packet from the network device to a first device via a network, receiving a second data packet at the network device from a second MODEM of a second MODEM pool, and transmitting a second packet from the network device to a second device via the network. The first data packet includes first data and a first VRF instance identifier. The first packet includes the first data and a first header that includes a first indicator associated with a first VRF instance. The first VRF instance is associated with a first service and a first user group. The second data packet includes second data and a second VRF instance identifier. The second packet includes the second data and a second header that includes a second indicator associated with a second VRF instance. The second VRF instance identifier is associated with a second service and a second user group.

DETAILED DESCRIPTION

Figure 1:
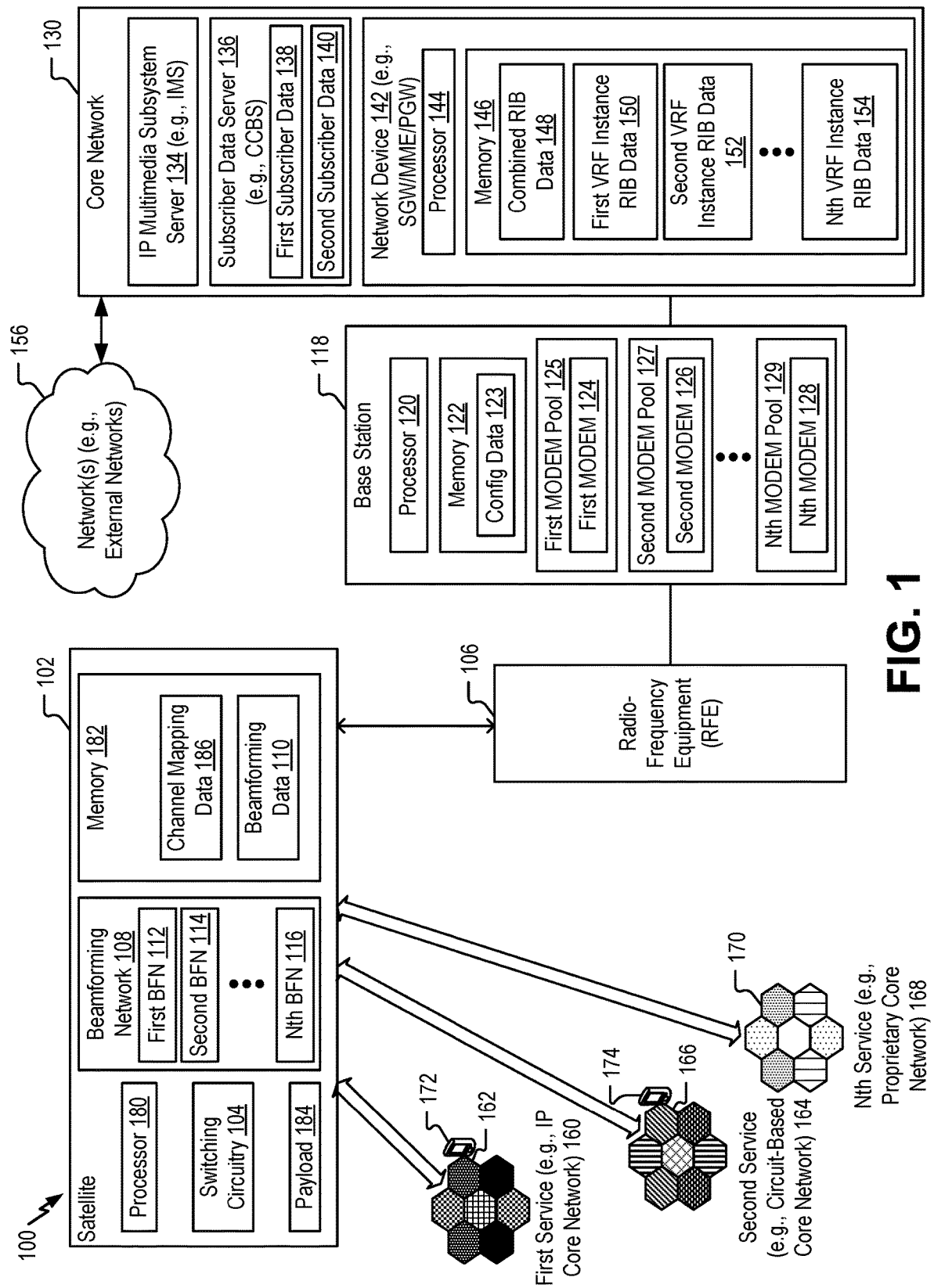
FIG. 1 is a block diagram that illustrates a first example of an implementation of a system that processes network traffic associated with different virtual routing and forwarding (VRF) instances corresponding to different pairs of user groups and services.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Implementations disclosed herein are directed to systems and methods for providing network traffic isolation on a per-user group and per-service basis within a cellular system. In some implementations, the systems and methods described herein are described with reference to federated networks. In other implementations, the systems and methods described herein apply to other types of networks. A cellular system includes multiple components, such as network devices (e.g., "core network" devices), a base station, a beamforming network, radio-frequency (RF) equipment (RFE), a switching circuitry, or other components. An operator (e.g., a Tier-1 operator) of the cellular system may sell access to the cellular system to other closed user groups ("CUGs") to provide various network services. As used herein, "CUGs" refers to Tier-2 operators (e.g., service providers) that pay for access to equipment associated with a Tier-1 operator. For convenience, a member of a CUG is referred to as a user. Tier-2 operators include mobile virtual network operators (MVNOs) and virtual network operators (VNOs), as non-limiting examples. In a particular aspect, a MVNO includes multiple CUGs. A person who subscribes to a service provided by a Tier-2 operator is referred to herein as a subscriber. In a particular aspect, the same type of service is provided by multiple CUGs. By isolating network traffic associated with each user group (e.g., a MVNO, a CUG within an MVNO, or a CUG associated with a service type) and each service, the systems and methods described improve security of data processed by a cellular system. Additionally, flexibility of the cellular system is increased because data associated with different user groups and different services is able to be processed according to different rules or criterions (instead of a set of overall rules or criterions for all user groups and all services).

In a particular aspect, a service includes at least one of first generation (1G) cellular communication, second-generation (2G) cellular communication, third generation (3G) cellular communication, fourth generation (4G) cellular communication, fifth generation (5G) cellular communication, high speed packet access (HSPA), high speed downlink packet access (HSDPA), high speed uplink packet access (HSUPA), a short message service (SMS), a multimedia message service (MMS), Internet of Things (IoT) communication, Worldwide Interoperability for Microwave Access (WiMax) communication, Institute of Electrical and Electronics Engineers (IEEE) 802.11x communication, Wi-Fi communication, digital video broadcasting—satellite (DVB-S) communication, digital video broadcasting—satellite—second generation (DVB-S2) communication, DVB-S2 extensions (DVB-S2X) communication, digital video broadcasting—return channel via satellite (DVB-RCS) communication, second generation DVB interactive satellite system (DVB-RCS2) communication, or proprietary government system communication.

To implement per-user group and per-service network traffic isolation, traffic associated with different pairs of user groups and services is encapsulated differently and is routed and forwarded through the cellular system using different routing information. In a particular implementation, a base station and a network device (e.g., a mobile management entity, a packet gateway such as a Packet Data Network Gateway (PGW), a serving gateway (SGW), etc.) are configured to encapsulate traffic associated with different pairs of user groups (e.g., different MVNOs) and services using different identifiers. To illustrate, in a particular implementation, the network device maintains different virtual routing and forwarding (VRF) instances for each user group and service pair, which includes maintaining different routing information base (RIB) data for each user group and service pair. Due to the different RIB data, traffic associated with a first user group and a first service may traverse a different path through an external network than traffic associated with a second user group and a second service.

In a particular implementation, traffic associated with different pairs of user groups and services is processed by different devices (or different components) within the cellular system. To illustrate, the base station includes multiple MODEM pools (e.g., physical MODEM pools, virtual MODEM pools, or logical MODEM pools) that include one or more MODEMs, and MODEMs of each MODEM pool are configured to process data packets associated with a corresponding user group and a corresponding service. As a particular example, one or more MODEMs of a first MODEM pool process data packets associated with a first user group and a first service (as indicated by a VRF instance identifier in the data packets), and one or more MODEMs of a second MODEM pool process data packets associated with a second user group and a second service. In a particular aspect, the one or more MODEMs of the first MODEM pool are distinct from the one or more MODEMs of the second MODEM pool. In some examples, the first user group and the first service are distinct from the second user group and the second service, respectively. In some examples, the first user group is distinct from the second user group and the first service is the same (e.g., of the same type) as the second service. In some examples, the first user group is the same as the second user group and the first service is distinct from the second service.

In addition to isolating the network traffic through networks and the cellular system by pairs of user groups and services, the cellular system may enable different pairs of user groups and services to access the cellular system via different portions of a RF spectrum (e.g., different RF channels or portions thereof). In a particular implementation, switching circuitry on-board a satellite is configured to receive RF signals from RF circuitry coupled to the base station and to perform "beam-to-beam" switching (e.g., RF signal switching) such that a RF signal received from the RF circuitry and corresponding to traffic associated with the first user group and the first service is used to generate a second RF signal that corresponds to a first portion of the RF spectrum associated with the first user group and the first service. Similarly, a third RF signal corresponding to traffic associated with the second user group and the second service is used to generate a fourth RF signal that corresponds to a second portion of the RF spectrum associated with the second user group and the second service. The second RF signal is provided to user devices associated with the first user group and subscribing to the first service. The fourth RF signal is provided to user devices associated with the second user group and subscribing to the second service. In a particular implementation, the RF signals are deployed in an overlay pattern at the same location such that multiple devices at the same location are able to access the cellular system via different portions of the RF spectrum (e.g., via different RF channels or portions thereof). The RF signals are mapped to corresponding VRF instances (e.g., to corresponding user groups and services) and are converted into data packets, for which processing is isolated by VRF instance, as described herein.

By isolating network traffic associated with different pairs of user groups (e.g., different service providers, government customers, or enterprise customers) and services, the system described herein improves data security as compared to other systems. For example, data associated with different pairs of user groups and services is encapsulated and processed using different VRF instance identifiers, thereby separating (e.g., isolating) data associated with a particular pair of user group and service from data associated with other pairs of user groups and services. Additionally, communications between the cellular system and subscriber devices are performed using different RF channels (or other frequency bands), further isolating communications associated with a particular user group and service pair from communications associated with other user group and service pairs. Such network traffic isolation improves data security at the cellular system with respect to the different user groups (e.g., the different service providers) and the different services. Additionally, flexibility of the cellular system is increased because traffic associated with a particular user group and service pair is able to be processed using different rules or policies than data associated with other user group and service pairs.

Network traffic isolation on a per-user group and per-service basis is described as an illustrative example. In some implementations network traffic isolation is provided based on various criteria, such as quality of service, user group, service, user, or a combination thereof. In these implementations, different portions of a RF spectrum are assigned based on the criteria. For example, a first portion of the RF spectrum corresponds to a first quality of service, a first user group, a first service, a first user, or a combination thereof, and a second portion of the RF spectrum corresponds to a second quality of service, a second user group, a second service, a second user, or a combination thereof. Traffic that satisfies different criteria is processed by different devices (or different components). For example, one or more first MODEMs are configured to process data packets associated with the first quality of service, the first user group, the first service, the first user, or a combination thereof, and one or more second MODEMs are configured to process data packets associated with the second quality of service, the second user group, the second service, the second user, or a combination thereof.

FIG. 1 illustrates an example of a system 100 configured to process network traffic associated with different virtual routing and forwarding (VRF) instances corresponding to different pairs of user groups and services. The system 100 includes a satellite 102 that includes switching circuitry 104 and a beamforming network 108, RFE 106, a base station 118, and a core network 130 that includes a network device 142, a subscriber data server 136, and an internet protocol (IP) multimedia subsystem server 134. Although components 102, 104, 106, 108, 118, 134, 136, and 142 are illustrated as being included in the system 100, in other implementations, one or more of the components 102, 104, 106, 108, 118, 134, 136, and 142 are not included (and corresponding functions are performed by one or more of the remaining components). In other implementations, the system 100 includes additional components that are not illustrated.

The satellite 102 is configured to perform communications with one or more devices (e.g., one or more subscriber devices). The one or more devices include mobile devices, such as mobile phones, tablet computers, laptop computers, smart watches, media playback devices, navigation systems, personal digital assistants (PDAs), satellite phones, vehicles (or components thereof), or a combination thereof, as non-limiting examples. In some implementations, the one or more devices also include stationary computerized devices. The satellite 102 includes a processor 180, a memory 182, the switching circuitry 104, the beamforming network 108, and a payload 184. The payload 184 includes one or more antennas configured to perform communication operations with the one or more devices. In a particular implementation, the system 100 includes or corresponds to a satellite-based cellular system. In another particular implementation, the system 100 includes or corresponds to a hybrid cellular system (e.g., a hybrid satellite and terrestrial cellular system). For example, the satellite 102 may communicate with the one or more devices via one or more components, such as antenna(s), satellite(s), tower(s), etc., of a terrestrial-based cellular system. In an alternate implementation, the system 100 includes or corresponds to a terrestrial-based cellular system, as further described with reference to FIG. 2.

The switching circuitry 104 is configured to divide a frequency spectrum (e.g., a RF spectrum) into multiple smaller frequency "slices" (e.g., sub-bands, channels, sub-channels, etc.). As an example, the switching circuitry 104 is configured to divide an incoming ultrawideband signal into channels or sub-channels for transmission to another device or component. Although RF signals are described herein, in other implementations, other frequency signals may be used. In a particular implementation, the switching circuitry 104 is configured to divide RF signals into narrower bandwidths than other filtering equipment. As a particular example, other filtering equipment may divide RF signals into sizes referred to as "transponders" or "transponder-size" that have a range of approximately 30-70 megahertz (MHz). In contrast, the switching circuitry 104 is configured to divide the RF spectrum (or another frequency spectrum) into bands or slices of approximately 31 kilohertz (kHz). Although referred to as portions of frequency bands or frequency channels (e.g., RF channels), signals may also be divided into time-based channels or subchannels (e.g., for time-division multiple access (TDMA) signals) or code-based channels or subchannels (e.g., for code-division multiple access (CDMA) signals).

The beamforming network 108 is configured to enable beamforming to the one or more devices. In a particular implementation, the beamforming network 108 is configured to apply beamforming weights to RF signals (e.g., "beams") to modify directivity and spatial selectivity of the RF signals to and from the one or more devices. In a particular implementation, the beamforming weights are stored as beamforming data 110 at the memory 182, and each set of beamforming weights is associated with a corresponding user group and a corresponding service (e.g., the beamforming weights are assigned on a per-user group and per-service basis), as further described herein.

In the implementation illustrated in FIG. 1, the beamforming network (BFN) 108 includes a first BFN 112, a second BFN 114, and an Nth BFN 116. Although three BFNs in the BFN 108 are illustrated, in other implementations, N may be any integer greater than two. In a particular implementation, the first BFN 112 is assigned to perform operations on RF signals associated with a first service, a first user group, or both. For example, the first BFN 112 is associated with first beamforming weights associated with the first service, the first user group, or both. In a particular aspect, the second BFN 114 is assigned to perform operations on RF signals associated with a second service, a second user group, or both. In a particular aspect, each of the BFNs 112, 114, and 116 is assigned to perform operations on RF signals on a unique pair of service and user group.

As used herein, a "user" includes a Tier-2 operator or other service provider that provides services by using network resources of a Tier-1 operator, such as a Tier-1 operator that owns and operates the system 100. CUGs include mobile virtual network operators (MVNOs), virtual network operators (VNOs), or other service providers that provide services to subscribers using the system 100. In a particular aspect, a "user group" includes a plurality of users, a plurality of MVNOs, a CUG within a MVNO, a CUG associated with a particular type of service, or a combination thereof. Subscribers include people that subscribe to a service provided by the service providers (e.g., the CUGs) and access the system 100 using devices, such as a mobile phone or other equipment. In the particular implementation illustrated in FIG. 1, the switching circuitry 104 and the beamforming network 108 are integrated in the satellite 102. In another particular implementation, the switching circuitry 104 and the beamforming network 108 are coupled between the RFE 106 and the base station 118, as described with reference to FIG. 2. In a particular aspect, the base station 118, the core network 130, or both, include terrestrial components.

In a particular implementation, the switching circuitry 104 is configured to generate a plurality of sets of RF signals associated with a corresponding portion of a RF spectrum. For example, each set of RF signals includes one or more RF signals that correspond to a particular portion of the RF spectrum, such as a particular RF channel (or a particular plurality of RF channels). The plurality of sets of RF signals include at least one RF signal associated with a particular portion of the RF spectrum that is associated with a unique pair that includes a user group and a service. To illustrate, the plurality of RF signals includes a first RF signal that corresponds to a particular portion of the RF spectrum (e.g., a particular RF channel) that is designated for communications associated with a first user group (e.g., first MVNOs) and a first service. To further illustrate, the plurality of RF signals includes a second RF signal that corresponds to a particular portion of the RF spectrum (e.g., a second particular RF channel) that is designated for communications associated with a second user group (e.g., second MVNOs) and a second service.

In a particular implementation, the beamforming network 108 is configured to adjust a phase, an amplitude, or both of the RF signals based on the beamforming data, which indicates a first set of beamforming weights associated with the first user group and the first service and a second set of beamforming weights associated with the second user group and the second service. For example, the first BFN 112 is configured to adjust a phase, amplitude, or both of RF signals based on the first set of beamforming weights and the second BFN 114 is configured to adjust a phase, amplitude, or both of RF signals based on the second set of beamforming weights. The RF signals are transmitted (e.g., deployed) to one or more locations to enable wireless communications with devices associated with the two user groups and the two services via different portions of the RF spectrum, as further described herein. Although illustrated as two components, in a particular implementation, the switching circuitry 104 and the beamforming network 108 are integrated or correspond to a single component, or the operations of the switching circuitry 104 and the beamforming network 108 are performed by the processor 180.

The RFE 106 is configured to process RF signals that are received from or that are to be sent (e.g., transmitted) to the one or more devices via the satellite 102. As an example, the RFE 106 includes one or more filters, one or more amplifiers, one or more mixers, one or more other components, or a combination thereof, that process RF signals received from or that are to be sent to the one or more user equipment (UE) devices via the satellite 102.

The base station 118 includes a processor 120 and a memory 122, and the base station 118 is configured to receive RF signals from the one or more devices (e.g., via the components 102-108, 112-116) and to process the RF signals. In a particular implementation, the processor 120 is configured to execute instructions stored at the memory 122 to perform the operations described herein. In an alternate implementation, the base station 118 includes hardware, such as an application-specific integrated circuit (ASIC), a field-programmable gate array (FPGA), or a controller, that performs the operations described herein.

To illustrate, the base station 118 is configured to convert the RF signals into the digital domain to generate data packets for routing through the core network 130. To generate the data packets, the base station 118 includes multiple MODEM pools including multiple MODEMs. In a particular implementation, each MODEM pool is assigned to a particular user group (e.g., particular MVNOs) and a particular service, and one or more MODEMs from the particular MODEM pool are assigned to process data packets associated with the corresponding user group and the corresponding service. Although described as individual MODEMs, in some implementations the base station 118 includes a single MODEM that is virtualized to provide virtual MODEM pools and virtual MODEMs that perform the operations of the MODEMs described herein. In other implementations, the MODEMs may be physical MODEMs, logical MODEMs, virtual MODEMs, or a combination thereof.

In the implementation illustrated in FIG. 1, the base station 118 includes a first MODEM 124, a second MODEM 126, and an Nth MODEM 128. For example, each of the first MODEM 124, the second MODEM 126, and the Nth MODEM 128 is instantiated at the base station 118. Although three MODEMs are illustrated, in other implementations, N may be any integer greater than two. Each MODEM is part of a MODEM pool. As an example, a first MODEM pool 125 includes the first MODEM 124, a second MODEM pool 127 includes the second MODEM 126, and an Nth MODEM pool 129 includes the Nth MODEM 128. Although one MODEM per MODEM pool is illustrated, such illustration is not limiting. MODEM pools may include any number of MODEMs. In the implementation illustrated in FIG. 1, each of the first MODEM pool 125, the second MODEM pool 127, and the Nth MODEM pool 129 is instantiated at the base station 118. In a particular implementation, the MODEMs of the first MODEM pool 125 are assigned to perform operations on traffic associated with a first service, and the MODEMs of the second MODEM pool 127 are assigned to perform operations on traffic associated with a second service. In a particular aspect, a first MODEM of the first MODEM pool 125 and a second MODEM of the first MODEM pool 125 are assigned to perform operations on traffic associated with a first user group and a second user group, respectively, that provide the first service.

In a particular implementation, the MODEMs are configured to generate data packets based on RF signals from devices that are associated with different pairs of user groups and services. The data packets include identifiers that associate each data packet with a particular user group and a particular service. For example, a data packet includes an identifier of a virtual routing and forwarding (VRF) instance. The VRF instance corresponds to a user group (e.g., Tier-2 operators or other service providers) and a service and is used to perform routing at the network device 142, as further described herein. In a particular example, the VRF instance is instantiated at the network device 142. In a particular implementation, RF signals are assigned to MODEMs for processing based on configuration data 123 stored at the memory 122. In a particular implementation, the configuration data 123 indicates an association between VRF identifiers and pairs of user group identifiers and service identifiers. To illustrate, the configuration data 123 indicates that a particular pair (including a particular user group identifier and a particular service identifier) is associated with a VRF instance (that corresponds to a particular user group identified by the user group identifier and to a particular service identified by the service identifier). Data packets, including VRF instance identifiers, are sent from the base station 118 to the network device 142.

The network device 142 includes a processor 144 and a memory 146, and the network device 142 is configured to route traffic between the one or more devices and a network 156 (e.g., an external network, such as a network maintained by another Tier-1 provider, the Internet, etc.). In a particular implementation, the processor 144 is configured to execute instructions stored at the memory 146 to perform the operations described herein. In an alternate implementation, the network device 142 includes hardware, such as an ASIC, a FPGA, or a controller, that performs the operations described herein. The network device 142 may include or correspond to a signaling gateway, a packet gateway, a mobility management entity (MME), or a combination thereof. In a particular implementation, the network device 142 is a single device that performs that the functions of a signaling gateway, a packet gateway, and an MME. Alternatively, more than one communicatively coupled device may perform the operations of the network device 142.

In a particular implementation, the network device 142 is configured to receive data packets from MODEMs of the base station 118 and to generate packets to be sent through the core network 130 (e.g., the subscriber data server 136 and the IP multimedia subsystem server 134) to other devices of the network 156, as further described herein. The subscriber data server 136 (e.g., a customer charging and billing subsystem (CCBS)) is configured to monitor network use for billing and provisioning. In a particular implementation, the subscriber data server 136 is configured to track network usage and perform billing on a per-user group and a per-service basis. As a non-limiting example, information regarding usage for subscribers is maintained and stored for each user group and each service. The IP multimedia subsystem is configured to perform operations such as initiating and maintaining voice sessions, initiating and maintaining data sessions, initiating phone rings, and other such activities that enable phone, data, and other services at the one or more devices. In some implementations, the core network 130 also includes one or more security or cybersecurity systems that are configured to provide secure logical isolation of the system 100 to external networks, such as the network 156.

During operation, the system 100 enables multiple user groups (e.g., Tier-2 operators or service providers) to provide multiple services, such as a first service 160 (e.g., an IP core network service), a second service 164 (e.g., a circuit-based core network service), and an Nth service 168 (e.g., a proprietary core network service), to subscribers via the system 100. Although three services are illustrated, in other implementations, N may be any integer greater than two. To support multiple user groups (e.g., CUGs) and multiple services, a beam map and beamforming weights may be created and stored as the beamforming data 110. In a particular implementation, the beam map identifies a frequency re-use pattern for beams directed to multiple cells (e.g., earth cells) such that particular frequency bands (e.g., channels, subchannels, etc.) can be re-used in different, non-adjacent cells. In another particular implementation, the beamforming data 110 indicates a carrier map that identifies an initial capacity and carrier configuration for each beam generated by the switching circuitry 104. In another particular implementation, each user group and service pair is associated with a corresponding cell size, beam weight, pattern, capacity, and carrier assignment, and the beamforming data 110 indicates multiple sets of beamforming weights (and other information, such as cell size, pattern, capacity, carrier assignment, etc.) associated with multiple pairs of user groups and services. In some implementations, the beamforming data 110 (or portions thereof) is adjusted over time, such as based on changing subscriber density, changing traffic loading patterns, user group policies, or service policies.

In a particular implementation, the satellite 102 transmits a plurality of RF signals (e.g., beams) in one or more patterns in one or more regions. Each pattern of RF signals corresponds to a user group (e.g., first MVNOs) and service pair and enables wireless communication between devices associated with the user group and service pair and the system 100. To illustrate, the switching circuitry 104 receives data (e.g., from the network device 142 after performance of one or more association operations) that indicates a unique user group and service (e.g., the first service 160) pair is associated with a particular portion of a frequency spectrum, and the switching circuitry 104 generates at least one beam associated with the particular portion. In a particular implementation, the beamforming network 108 adjusts the plurality of RF signals based on the beamforming data 110, and each RF signal is transmitted via a portion of the frequency spectrum associated with a corresponding pair (e.g., including a user group and a service). For example, the first BFN 112 adjusts a first RF signal based on a first set of beamforming weights corresponding to a first user group and the first service 160, and the second BFN 114 adjusts a second RF signal based on a second set of beamforming weights corresponding to a second user group and the second service 164. The first RF signal is transmitted via a first portion of the frequency spectrum corresponding to the first user group and the first service 160. The second RF signal is transmitted via a second portion of the frequency spectrum corresponding to the second user group and the second service 164. In a particular implementation, the satellite 102 stores data that indicates an association between each unique pair (e.g., each user group and service pair) and a corresponding portion of a frequency spectrum, such as the channel mapping data 186 stored at the memory 182.

The satellite 102 may transmit (e.g., deploy) the plurality of RF signals in one or more patterns to one or more regions. In a particular implementation, the satellite 102 deploys one or more RF signals in a first pattern 162, a second pattern 166, and an Nth pattern 170. Each of the patterns 162, 166, and 170 is associated with a different user group and service pair. In a particular implementation, the first pattern 162 is associated with the first service 160 and a first user group, the second pattern 166 is associated with the second service 164 and a second user group, and the Nth pattern 170 is associated with the Nth service 168 and an Nth user group. One or more of the patterns 162, 166, and 170 may be overlaid in the same region. To illustrate, the patterns 162, 166, and 170 are overlaid in a particular region to provide wireless communication services to subscribers in the particular region via different RF channels (or other frequency bands) associated with the different pairs of user groups (e.g., CUGs) and services. Alternatively, one or more of the patterns 162, 166, and 170 may be deployed in different regions. To illustrate, a subscriber at a first region accesses the system 100 via a first RF channel, and a second subscriber at a second region accesses the system 100 via a second RF channel.

A particular example is provided to illustrate operations of the system 100. In this example, the first pattern 162, the second pattern 166, and the Nth pattern 170 are overlaid on top of each other in a first region. A first device 172 (e.g., a first subscriber device) that enters the first region synchronizes to available operator frequencies and receives data, such as master information block data and system information block data, that indicates available user groups (e.g., CUGs) that offer services via the system 100. If the first device 172 is associated with the first service 160 and the first user group (e.g., if the subscriber associated with the first device 172 subscribes to the first service 160 provided by the first user group), the first device 172 performs one or more association operations and performs supported wireless communications via the portion of the frequency spectrum associated with the first service 160 and the first user group. In the same location, a second device 174 (e.g., a second subscriber device) that is associated with the second service 164 and the second user group performs one or more association operations and performs supported wireless communication via the portion of the frequency spectrum associated with the second service 164 and the second user group.

In this manner, the portion of the frequency spectrum associated with the first service 160 and the first user group is accessible by devices (e.g., subscriber devices) located at the first location and that are associated with (e.g., subscribe to) the first service 160 offered by the first user group. The portion of the frequency spectrum is inaccessible by devices (e.g., subscriber devices) located at the first location that are not associated with the first service 160 and the first user group. However, devices may be associated with other user groups, other services, both, and may access different portions of the frequency spectrum at the same location. Thus, different devices associated with different pairs of user groups and services may access the system 100 using different frequencies at the same location.

In another particular implementation, a particular pattern of RF signals includes a first set of RF signals corresponding to a RF channel(s) associated with the first service 160 and the first user group, a second set of RF signals corresponding to RF channel(s) associated with the second service 164 and the second user group, and a third set of RF signals corresponding to RF channel(s) associated with the Nth service 168 and the Nth user group. The particular pattern is deployed at multiple different locations. As a particular example, the particular pattern is deployed at Chicago, Washington D.C., and New York. Subscribers are able to access communication services associated with each pair of user groups and services using corresponding RF channels that are the same at each location, as part of a frequency re-use design. To illustrate, subscribers located in each of the three cities are able to access the first service 160 provided by the first user group via a first RF channel, the second service 164 provided by the second user group via a second RF channel, and the Nth service 168 provided by the Nth user group via a third RF channel. Alternatively, different patterns can be deployed to different locations. As a particular example, a first pattern including RF channels associated with the first service 160 and the first user group and second RF channels associated with the second service 164 and the second user group is deployed at Chicago, and a second pattern including third RF channels associated with the first service 160 and the first user group and fourth RF channels associated with the Nth service 168 and the Nth user group is deployed at New York. Subscribers associated with the first user group access the first service 160 via the first RF channels at Chicago and via the third RF channels at New York, subscribers associated with the second user group access the second service 164 via the second RF channels at Chicago (and do not access the second service 164 at New York), and subscribers associated with the Nth user group access the Nth service 168 via the fourth RF channels at New York (and do not access the Nth service 168 at Chicago).

Performing the one or more association operations may include performing a radio link attachment operation, a network registration operation, an IP multimedia subsystem (IMS) operation, other association operations, or a combination thereof. In a particular implementation, the one or more association operations are performed by the base station 118, the network device 142, other devices, or a combination thereof. In this implementation, the base station 118 and the network device 142 store data at the memories 122, 146, respectively, that associates devices to pairs of user groups (e.g., CUGs) and services and that is updated during performance of the one or more association operations. Additional details regarding the one or more association operations are described with reference to FIG. 2.

Once devices are associated with the selected pair of user group and service, the devices may send RF signals to (or receive RF signals from) the system 100 via the corresponding portion of the frequency spectrum. In a particular implementation, the first device 172 sends a first RF signal via a first portion of the frequency spectrum (e.g., a first RF channel) corresponding to the first service 160 and the first user group, and the second device 174 sends a second RF signal via a second portion of the frequency spectrum (e.g., a second RF channel) corresponding to the second service 164 and the second user group. The RF signals are received by the satellite 102 and provided to the RFE 106 for processing. In a particular implementation, the RFE 106 is configured to perform one or more processing operations (e.g., amplifying, noise reduction, etc.) on the first RF signal and the second RF signal.

The base station 118 receives the first RF signal and the second RF signal and designates particular MODEMs to process the RF signals (and the resultant data packets) or incoming data packets, as further described herein. In a particular implementation, the first MODEM 124 is configured to generate a first data packet based on the first RF signal and the second MODEM 126 is configured to generate a second data packet based on the second RF signal. The designation of particular MODEMs of particular MODEM pools to process the RF signals (or data packets) is based on the pair of user groups and services associated with the RF signals (or data packets) and the configuration data 123. As a particular example, the configuration data 123 indicates that the first device 172 (e.g., based on an indicator of a device ID associated with the first device 172) is associated with a first pair (e.g., including the first service 160 and the first user group) that corresponds to the first VRF instance identifier and that the second device 174 is associated with a second pair (e.g., including the second service 164 and the second user group) that corresponds to the second VRF instance identifier. Based on the configuration data 123 and the indicators of the device IDs, the base station 118 (e.g., the processor 120) is configured to designate the first MODEM 124 to process the first RF signal (e.g., an RF signal or a data packet associated with the first service 160 and the first user group) and to designate the second MODEM 126 to process the second RF signal (e.g., an RF signal or a data packet associated with the second service 164 and the second user group). In a particular implementation, the indicator includes a phone number associated with a device, a subscription identifier (e.g., a mobile subscriber integrated services digital network number (MSISDN)), or any other kind of indicator of a device's identity.

In a particular implementation, each MODEM of the plurality of MODEMs of the base station 118 is configured to process traffic (e.g., RF signals, data packets, etc.) associated with a corresponding VRF instance identifier. To illustrate, the first MODEM 124 and other MODEMs of the first MODEM pool 125 are configured to process RF signals and data packets associated with a first VRF instance identifier that corresponds to a first VRF instance associated with the first service 160 and the first user group. In a particular implementation, the first MODEM 124 is further configured to refrain from processing RF signals and data packets associated with other VRF instance identifiers, such as a second VRF instance identifier that corresponds to a VRF instance associated with the second service 164 and the second user group. Similarly, the second MODEM 126 and other MODEMs of the second MODEM pool 127 are configured to process data packets associated with the second VRF instance identifier and to refrain from processing RF signals and data packets associated with the first VRF instance identifier.

Processing the RF signals at the MODEMs 124-128 includes generating data packets including data and corresponding VRF instance identifiers. To illustrate, based on a determination that the first device 172 is associated with the first service 160 and the first user group, the base station 118 designates the first MODEM 124 to generate a first data packet based on the first RF signal. Based on a determination that the second device 174 is associated with the second service 164 and the second user group, the base station 118 designates the second MODEM 126 to generate a second data packet based on the second RF signal. The first data packet includes first data and the first VRF instance identifier, and the second data packet includes second data and the second VRF instance identifier.

In a particular implementation, the MODEMs 124-128 are configured to encrypt the data packets on a per-VRF (or per-user group and per-service) basis. To illustrate, the first MODEM 124 is further configured to encrypt the first data packet based on a first encryption associated with the first VRF instance, and the second MODEM 126 is configured to encrypt the second data packet based on a second encryption associated with the second VRF instance. In a particular implementation, the first encryption and the second encryption are the same type of encryption, however different keys or other values are used to perform the corresponding encryptions. In an alternate implementation, the first encryption and the second encryption performed using different types of encryption. Encrypting data associated with one pair of user group and service differently from encrypting data associated with another pair of user group and service may improve security and separation of data corresponding to the different pairs of user groups and services. To illustrate, encrypted data that is erroneously provided to a device associated with a different user group and different service is not decrypted using the same encryption as other data received by the device.

The first data packet and the second data packet are sent to the network device 142. In a particular implementation, data packets (including the first data packet and the second data packet) are sent via an Institute of Electrical and Electronics Engineers (IEEE) 802.11Q compliant connector or trunk. In a particular implementation, the connector includes a 10 gigabyte (gB) fiber pipe. In a particular implementation, the base station 118, via the MODEMs 124-128, manages the modulation and coding (MOCOD), timeslot assignment, and queues for the data packets (e.g., evolved packet system (EPS) bearers) based on one or more network quality criterions. Additional details regarding the data packets are described with reference to FIG. 2.

The network device 142 receives data packets and generates packets for transmission through the core network 130 and the network 156 to one or more other devices. For example, the network device 142 is configured to receive the first data packet and to transmit a first packet to a first device via the network 156. The network device 142 is further configured to receive the second data packet and to transmit a second packet to a second device via the network 156. In a particular implementation, the first device and the second device are the same device. In an alternate implementation, the first device and the second device are different devices. The first packet includes the first data and a first header that includes a first indicator associated with the first VRF instance, and the second packet includes the second data and a second header that includes a second indicator associated with the second VRF instance.

In a particular implementation, multiple VRF instances are maintained at the network device 142. Maintaining multiple VRF instances includes maintaining multiple routing information bases (RIBs) (e.g., routing and forwarding data) to be used for routing packets at the network device 142. As a particular example, the network device 142 stores first VRF instance RIB data 150, second VRF instance RIB data 152, and Nth VRF instance RIB data 154 at the memory 146. Although three instances of RIB data are illustrated in FIG. 1, in other implementations, N is any other integer greater than two. The VRF instance RIB data 150-154 include or indicate routing information, forwarding information, or a combination thereof.

In a particular implementation, each of the VRF instance RIB data 150-154 is associated with a user group and service pair. As an example, the first VRF instance RIB data 150 is associated with the first service 160 and the first user group, the second VRF instance RIB data 152 is associated with the second service 164 and the second user group, and the Nth VRF instance RIB data 154 is associated with the Nth service 168 and the Nth user group. The VRF instance RIB data 150-154 enables different routing paths to be established for traffic associated with different pairs of user groups and services. For example, a routing path from the first device 172 to the first device of the network 156 may traverse different devices or portions of devices (e.g., different MODEMs of the base station 118) through the system 100, the core network 130, and the network 156 than a routing path from the second device 174 to the second device of the network 156. Alternatively, the routing path from the first device 172 to the first device of the network may be the same as the routing path from the second device 174 to the second device of the network.

By maintaining different RIBS for different VRF instances and by designating different resources (e.g., MODEMs) of the base station 118 for different VRF instances, logical isolation of traffic on a per-user group and per-service basis is provided. To illustrate, traffic to and from the first device 172 (e.g., a subscriber device associated with the first service 160 and the first user group) traverses the system 100 at different timeslots or with different modulation and coding than traffic to and from the second device 174 (e.g., a subscriber device associated with the second service 164 and the second user group). Additionally, routes through the core network 130 and the network 156 may be different for traffic to and from the first device 172 than traffic to and from the second device 174 due to differences between the first VRF instance RIB data 150 and the second VRF instance RIB data 152. By logically isolating traffic on a per-user and per-service basis, security of a user's traffic is improved compared to systems that do not maintain different VRF instances for different pairs of user groups and services.

In a particular implementation, the network device 142 stores combined RIB data 148 at the memory 146 for use in routing packets through the core network 130 and the network 156. The combined RIB data 148 is based on the VRF instance RIB data 150-154 and any additional routing information generated by the network device 142 (e.g., routing associated with packets that do not correspond to one of the VRF instances). When a data packet is received at the network device 142, the corresponding VRF instance RIB data is updated. To illustrate, the network device 142 updates the first VRF instance RIB data 150 based on the first data packet, and the network device 142 updates the second VRF instance RIB data 152 based on the second data packet.

In a particular implementation, the network device 142 generates packets (including headers that include indicators of corresponding VRF instances) based on the received data packets and the combined RIB data 148. As an example, the network device 142 generates a first packet that includes the first data and a first header that includes a first indicator associated with the first VRF instance, and the network device 142 generates second packet includes the second data and a second header that includes a second indicator associated with the second VRF instance. The first indicator and the second indicator include or correspond to an identifier, such as a source IP address or a source port address, as non-limiting examples. In a particular implementation, the indicators correspond to labels or to "5-tuples" (e.g., a tuple that includes a source address, a source port, a destination address, a destination port, and a protocol associated with the packet). Encapsulating the first data associated with the first VRF instance using a different header than the second data associated with the second VRF instance logically isolates the first data from the second data during processing by devices of the core network 130 and the network 156.

After transmission by the network device 142, the packets traverse the core network 130 and the network 156 on a route to the eventual destination device(s). In some implementations, at least some components of the core network 130 process the packets on a per-VRF basis. In a particular implementation, the subscriber data server 136 generates (or updates) first subscriber data 138 based on the first packet and generates (or updates) second subscriber data 140 based on the second packet. The first subscriber data 138 indicates provisioning information, billing information, usage information, or a combination thereof, associated with subscribers of the first service 160 provided by the first user group, and the second subscriber data 140 indicates provisioning information, billing information, usage information, or a combination thereof, associated with subscribers of the second service 164 provided by the second user group. In a particular implementation, other components of the core network 130 process traffic on a per-VRF basis. As an example, the IP multimedia subsystem server 134 performs one or more operations on the first packet based on policies or rules corresponding to the first service 160 and the first user group, and the IP multimedia subsystem server 134 performs one or more operations on the second packet based on policies or rules corresponding to the second service 164 and the second user group. In another particular implementation, one or more security or cybersecurity devices or systems (also referred to as a "demilitarized zone" (DMZ)) processes traffic based rules or policies associated with a corresponding VRF instance. VRF instance-based rules and policies enable traffic associated with a particular user group and service pair to be processed by devices of the core network 130 differently than traffic associated with other user group and service pairs.

Packets sent from devices of the network 156 to the subscriber devices are processed in a similar manner. The packets traverse the core network 130 and the rest of the system 100 on a per-VRF instance or per-user group and per-service basis until reaching the destination subscriber device. As an example, the network device 142 is configured to receive a third packet from the first device via the network 156 and to receive a fourth packet from the second device via the network 156. The third packet includes third data and a third header that includes an indicator associated with the first VRF instance, and the fourth packet includes fourth data and a fourth indicator associated with the second VRF instance. In a particular implementation, the third packet and the fourth packet are routed to the subscriber data server 136 prior to arrival at the network device 142, and the subscriber data server 136 updates corresponding subscriber data based on the third packet and the fourth packet, as described above.

In a particular implementation, the network device 142 updates the combined RIB data 148 based on the third packet and the fourth packet if any new routing information is associated with the third packet or the fourth packet. To illustrate, the network device 142 updates the first VRF instance RIB data 150 based on the third indicator being associated with the first VRF instance, and the network device 142 updates the second VRF instance RIB data 152 based on the fourth indicator being associated with the second VRF instance. The network device 142 may also generate data packets and transmit the data packets to particular MODEMs of the base station 118 based on received packets. As an example, the network device 142 generates a third data packet that includes the third data and the first VRF instance identifier, and the network device 142 generates a fourth data packet that includes the fourth data and the second VRF identifier.

After generating the third packet and the fourth packet, the network device 142 sends the third data packet to the first MODEM 124 (e.g., based on the third indicator being associated with the first VRF instance), and the network device 142 sends the fourth data packet to the second MODEM 126 (e.g., based on the fourth indicator being associated with the second VRF instance). The base station 118 converts the third data packet and the fourth data packet into a third RF signal and a fourth RF signal, respectively, for transmission to the corresponding subscriber devices. In a particular implementation, the RF signals are processed by the components 102-108, 112-116 prior to transmission to the devices. To illustrate, the RFE 106 is configured to process the third RF signal and the fourth RF signal, such as by performing filtering, amplification, etc.

The base station 118 indicates, to the RFE 106 and the satellite 102, that the different RF signals are associated with different VRF instances, and thus different pairs of user groups and services. In a particular implementation, the base station 118 associates RF signals corresponding to different VRF instances with different logical interfaces. For example, the base station 118 associates a first RF signal that corresponds to the first VRF instance (and a first user group and a first service) with a first logical interface between the base station 118 and the RFE 106 (or between the base station 118 and the satellite 102), and the base station 118 associates a second RF signal that corresponds to the second VRF instance (and a second user group and a second service). In an alternate implementation, the base station 118 sends RF signals corresponding to different VRF instances to different ports (e.g., physical ports, logical ports, virtualized ports, etc.) of the RFE 106. As a particular example, the first MODEM 124 sends a first RF signal associated with the first VRF instance (and the first user group and the first service) to a first port and the second MODEM 126 sends a second RF signal associated with the second VRF instance (and the second user group and the second service) to a second port.

In a particular implementation, RF signals associated with different logical interfaces (or sent to different ports) are transmitted to the satellite 102 via different portions of the RF spectrum (e.g., different RF channels). As a particular example, RF signals associated with the first logical interface (and thus associated with the first VRF, the first service 160, and the first user group) are transmitted via a first RF channel, and RF signals associated with the second logical interface (and thus associated with the second VRF, the second service 164, and the second user group) are transmitted via a different RF channel. In this manner, the satellite 102 receives indication of an association between an RF signal and a VRF instance (corresponding to a particular service provided by particular Tier-2 operators or service providers)

In a particular implementation, the satellite 102 is configured to receive the RF signals from the RFE 106 and to perform beam-to-beam switching to generate RF signals to be transmitted to the one or more devices based on the channel mapping data 186. As a particular example, the processor 180 (or the switching circuitry 104) is configured to initiate transmission of a second RF signal from one or more antennas of the payload 184 to the first device 172 based on the channel mapping data 186 and based on the first user group and the first service 160 associated with the first device 172. The second RF signal is based on a first RF signal received at the one or more antennas of the payload 184 from the RFE 106 (and associated with a first VRF instance). The first RF signal and the second RF signal may correspond to different RF channels. For example, the first RF signal corresponds to a first RF channel, and the second RF signal corresponds to a second RF channel that is different from the first RF channel.

In a particular implementation, the channel mapping data 186 indicates mappings of RF channels (or other portions of a frequency spectrum) for communicating with the one or more devices or the RFE 106 to pairs of user groups (e.g., CUGs) and services. As a particular example, the channel mapping data 186 indicates that the first service 160 and the first user group maps to at least the first RF channel for communications between the satellite 102 and the RFE 106 and to at least the second RF channel for communications between the satellite 102 and the first device 172 subscribed to the first service 160 provided by the first user group. The channel mapping data 186 may be generated (or updated) by an operator of a satellite control system when service providers (e.g., MVNOs) purchase capacity and access to the system 100. For example, when the first user group purchases capacity and access to the system 100 to provide the first service 160, the satellite control system transmits data to the satellite 102 indicating that the first user group and the first service 160 is associated with the first RF channel for communications between the satellite 102 and the RFE 106 and with the second RF channel for communications between subscriber devices (associated with the first user group and the first service 160) and the satellite 102. In some implementations, the channel mapping data 186 indicates groups of RF channels associated with each pair of user group and service, and at least some channels of each group of RF channels are associated with different locations. As additional user groups (e.g., CUGs) purchase capacity and access to the system 100 to provide services, data indicating mappings of the additional pairs of user groups and services to RF channels may be sent to the satellite 102 to update the channel mapping data 186.

In a particular implementation, the processor 180 is configured to initiate transmission of a fourth RF signal from the one or more antennas of the payload 184 to the second device 174 based on the channel mapping data 186 and based on the second service 164 and the second user group associated with the second device 174. In this example, the fourth RF signal is based on a third RF signal received at the one or more antennas of the payload 184 from the RFE 106. The third RF signal and the fourth RF signal correspond to different RF channels, and the third and fourth RF channels correspond to different RF channels as compared to the first and second RF channels, respectively. As a particular example, the third RF signal corresponds to a third RF channel that is different from the first RF channel, and the fourth RF signal corresponds to a fourth RF channel that is different from the third RF channel and the second RF channel. In this manner, different pairs of user groups and services are associated with different RF channel mappings, and traffic associated with different pairs of user groups and services is communicated by transmission of RF signals via different RF channels. As a particular example, a RF signal that is transmitted to the first device 172 corresponds to the second RF channel (e.g., a RF channel associated with the first service 160 and the first user group) and a RF signal that is transmitted to the second device 174 corresponds to the fourth RF channel (e.g., a RF channel associated with the second service 164 and the second user group). In another particular implementation, one or more antennas of the payload 184 are configured to overlay transmission of the second RF signal and the fourth RF signal at the same location.

Additional RF signals associated with the same pair of user group and service may be transmitted or received via the same RF channels. As a particular example, the processor 180 is configured to initiate transmission of a sixth RF signal from the one or more antennas of the payload 184 to the first device 172 based on the channel mapping data and based on the first service 160 and the first user group. In this example, the sixth RF signal is based on a fifth RF signal received at the one or more antennas of the payload 184 from the RFE 106. Because the fifth RF signal and the sixth RF signal are associated with the first service 160 and the first user group, the fifth RF signal corresponds to the first RF channel and the sixth RF signal corresponds to the second RF channel.

In a particular implementation, the satellite 102 (e.g., the processor 180, the switching circuitry 104, or both) sends RF signals to the RFE 106 based on RF signals received from the one or more subscriber devices and the channel mapping data 186. As a particular example, one or more antennas of the payload 184 receive an RF signal via the second RF channel from the first device 172, and the processor 180 initiates transmission of an RF signal to the RFE 106 via the first RF channel. The RFE 106 receives the RF signal via the first RF channel and processes the RF signal prior to providing the RF signal to the base station 118. In a particular implementation, based on the RF signal being received via the first RF channel (e.g., a RF channel associated with the first service 160 and the first user group), the base station 118 assigns the RF signal to a MODEM (e.g., the first MODEM 124) of the first MODEM pool 125 for processing. Traffic received at the satellite 102 from subscriber devices associated with other pairs of user groups and services is similarly processed and provided to the base station 118 via the RFE 106. In this manner, traffic sent to (or received from) subscriber devices associated with different pairs of user groups and services is isolated by communications via different RF channels (or other portions of a frequency spectrum). Performing communications associated with different pairs of user groups and services via different RF channels (or other portions of the frequency spectrum) may improve security and prevent data associated with a particular pair of user group and service from being processed together with data associated with a different pair of user group and service.

In a particular implementation, the beamforming network 108 adjusts the RF signals based on beamforming information associated with different pairs of user groups and services. As an example, the beamforming network 108 is configured to adjust the second RF signal (e.g., the RF signal transmitted to the first device 172) based on the beamforming data 110 stored at the memory 182 and based on the first RF signal (e.g., based on the RF channel via which the first RF signal is received). In a particular implementation, the beamforming data 110 indicates sets of beamforming weights that correspond to pairs of user groups that purchase capacity and access to the system 100 to provide services. As a particular example, the beamforming data 110 indicates a first set of beamforming weights associated with the first service 160 and the first user group and a second set of beamforming weights associated with the second service 164 and the second user group.

In a particular implementation, the first BFN 112 adjusts RF signals corresponding to the first service 160 and the first user group based on the first set of beamforming weights and the second BFN 114 adjusts RF signals corresponding to the second service 164 and the second user group based on the second set of beamforming weights. Adjusting the RF signals includes modifying amplitude, a phase, another characteristic, or a combination thereof of the RF signals. Adjusting the RF signals based on the beamforming weights is also referred to as applying the beamforming weights to the RF signals.

In a particular implementation, the first BFN 112 is configured to adjust a RF signal by applying one or more first beamforming weights of the beamforming data 110 (e.g., based on the RF signal being associated with the first service 160 and the first user group), and the BFN 114 is configured to adjust another RF signal by applying one or more second beamforming weights of the beamforming data 110 (e.g., based on the other RF signal being associated with the second service 164 and the second user group). Applying the beamforming weights adjusts the phase, the amplitude, another characteristic, or a combination thereof of the RF signals based on user-specific beamforming weights, which may increase directivity and spatial selectivity of the RF signals to the devices. The beamforming data 110 (or a portion thereof, such as a portion corresponding to a particular user group and a particular service) may be updated in accordance to changes in traffic loading patterns, user group policy, or service policy.

In a particular implementation, the switching circuitry 104 generates a plurality of beams based on the first RF signal and the third RF signal. To illustrate, the RF signals are received at an analog front-end of the switching circuitry 104, converted to the digital domain, switched through a multi-stage interconnect network, and converted back to the analog domain by the analog back-end of the switching circuitry 104. The RF signals are deployed by the satellite 102 via different portions of the frequency spectrum (e.g., based on the channel mapping data 186). For example, the first RF signal is converted to a particular portion of the frequency spectrum associated with the first service 160 and the first user group, and the second RF signal may be converted to a different particular portion of the frequency spectrum associated with the second service 164 and the second user group. The satellite 102 transmits the second RF signal (e.g., deploys one or more beams associated with the second RF signal in the first pattern 162) and transmits the fourth RF signal (e.g., deploys one or more beams associated with the fourth RF signal in the second pattern 166) to the first device 172 and the second device 174 via the corresponding portions of the frequency spectrum, respectively.

By maintaining different VRF instances for different pairs of user groups and services and by communicating traffic associated with different pairs of user groups and services via different RF channels (or other portions of a frequency spectrum), the system 100 may provide "end-to-end" logical isolation of traffic on a per-user group and per-service basis. As an example, traffic associated with the first service 160 and the first user group is encapsulated and identified based on the first VRF instance, as compared to traffic associated with the second service 164 and the second user group. The traffic associated with the first service 160 and the first user group is routed through the components of the system 100, such as the core network 130, and the network 156 via one or more paths that may be different than one or more paths by which traffic associated with the second service 164 and the second user group is routed. To further illustrate, the traffic associated with the first service 160 and the first user group is sent to (or received from) the first device 172 via different RF channels than the traffic associated with the second service 164 and the second user group. Providing logical isolation of traffic on a per-user and per-service basis improves security to each user group and service, as compared to processing all user groups' and services' traffic together. Isolating traffic on a per-user and per-service basis increases security of the system 100. Flexibility of the system 100 may also be increased as compared to systems that do not isolate traffic by user group and service. For example, the system 100 can be configured to process traffic associated with a particular user group and service pair in accordance with different rules or policies than other user group and service pairs.

In the above description, various functions performed by the system 100 of FIG. 1 are described as being performed by the components 102-108, 112-118, 134, 136, and 142. This is for illustration only. In other implementations, one or more of the components 102-108, 112-118, 134, 136, and 142 may be integrated in a single component that performs functions associated with multiple components. Additionally, various functions are described as being performed by the processor 120 based on execution of the instructions stored at the memory 122 or by the processor 144 based on execution of the instructions stored at the memory 146. This is for illustration only. In an alternate implementation, one or more functions performed by the processor 120 or by the processor 144 are instead be performed by one or more hardware components. For example, a first component may generate packets based on the combined RIB data 148 and the first VRF instance RIB data 150. Each component may be implemented using hardware (e.g., a field-programmable gate array (FPGA) device, an application-specific integrated circuit (ASIC), a digital signal processor (DSP), a controller, etc.), software (e.g., instructions executable by a processor), or a combination thereof.

Figure 2:
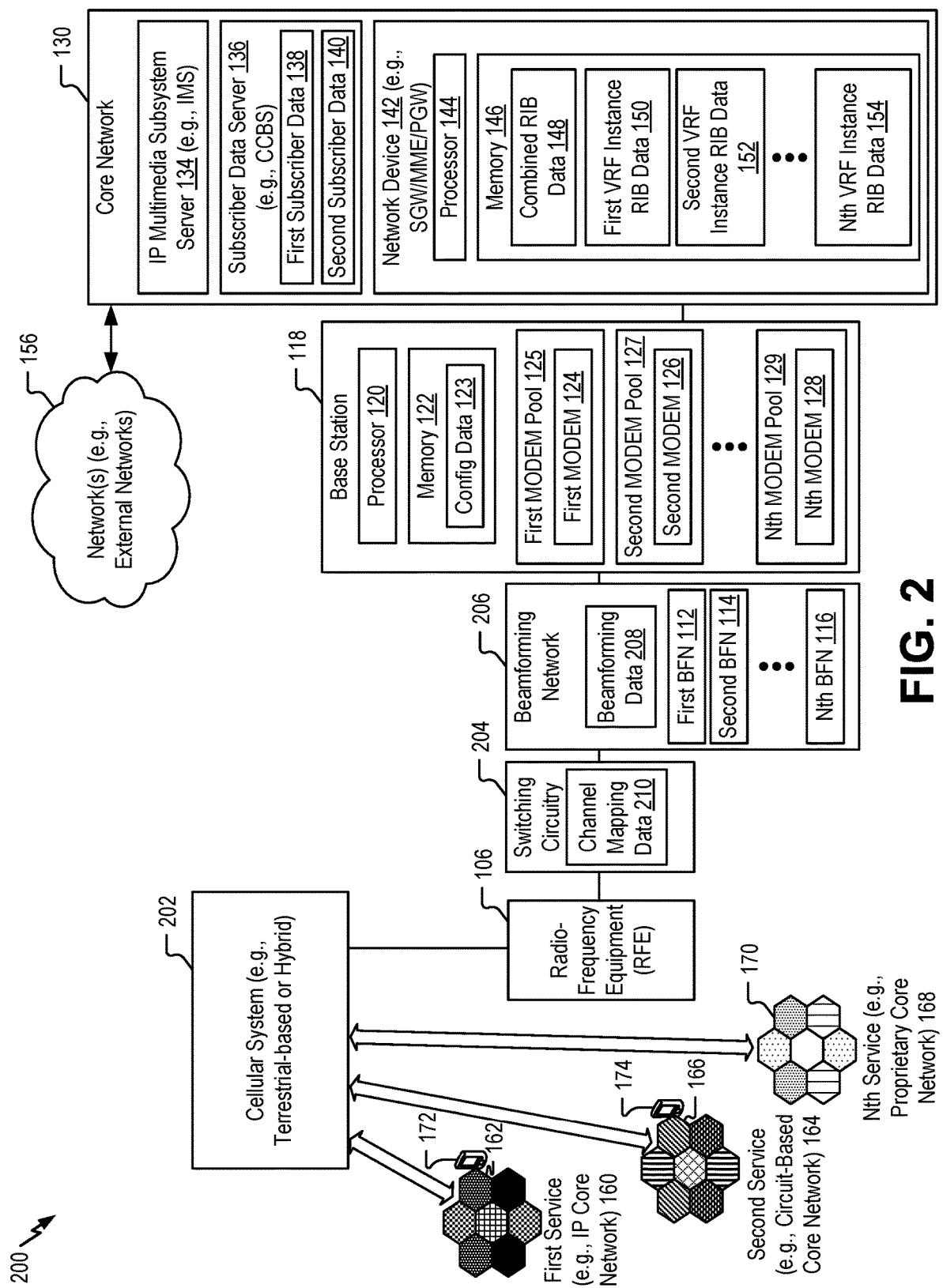
FIG. 2 is a diagram that illustrates a second example of an implementation of a system that processes network traffic associated with different VRF instances corresponding to different pairs of user groups and services.

FIG. 2 illustrates an example of a system 200 configured to process network traffic associated with different VRF instances corresponding to different pairs of user groups and services. The system 200 includes the RFE 106, the base station 118, the network device 142, the subscriber data server 136, and the IP multimedia subsystem server 134 of FIG. 1. Additionally, the system 200 includes a cellular system 202, switching circuitry 204, and a beamforming network 206. Although components 202, 204, 206, 106, 118, 134, 136, and 142 are illustrated as being included in the system 200, in other implementations, one or more of the components 202, 204, 206, 106, 118, 134, 136, and 142 are not included (and corresponding functions are performed by one or more of the remaining components).

Components 106, 118, 134, 136, and 142 are configured to perform the operations described with reference to FIG. 1. The switching circuitry 204 and the beamforming network 206 are configured to perform the operations described with reference to the switching circuitry 104 and the beamforming network 108 of FIG. 1. As an example, the switching circuitry 204 generates RF signals for transmission to the one or more devices via different RF channels (or other portions of a frequency spectrum) based on channel mapping data 210, as described with reference to FIG. 1. As another example, the beamforming network 206 adjusts one or more RF signals based on beamforming weights indicated by beamforming data 208 and associated with a particular pair of user group and service to adjust amplitude, phase, etc., of the one or more RF signals, as described with reference to FIG. 1. However, in the implementation illustrated in FIG. 2, the switching circuitry 204 and the beamforming network 206 are communicatively coupled between the RFE 106 and the base station 118 (instead of being integrated within a satellite).

In a particular implementation, the RF signals generated by the switching circuitry 204 (and processed by the RFE 106) are transmitted (e.g., deployed) to one or more subscriber devices by a cellular system 202. The cellular system 202 includes one or more components, such as antenna(s), satellite(s), tower(s), etc., that are configured to provide RF signals from one location to another. In a particular implementation, the cellular system 202 includes or corresponds to a terrestrial cellular system. In another particular implementation, the cellular system 202 includes or corresponds to a hybrid system (e.g., a system that includes terrestrial components, such as one or more towers, and one or more satellites).

During operation, the system 200 provides end-to-end network traffic isolation for different pairs of user groups and services, as described with reference to the system 100 of FIG. 1. However, in contrast to the system 100 of FIG. 1, channel mapping and beamforming operations are performed by terrestrial components. To illustrate, channel mapping and beamforming operations are performed by the switching circuitry 204 and the beamforming network 206, respectively, which are terrestrial components and communicatively coupled between the RFE 106 and the base station 118. Reducing the number of components integrated within a satellite may decrease costs and improve ease of repair of the system 200.

Figure 3:
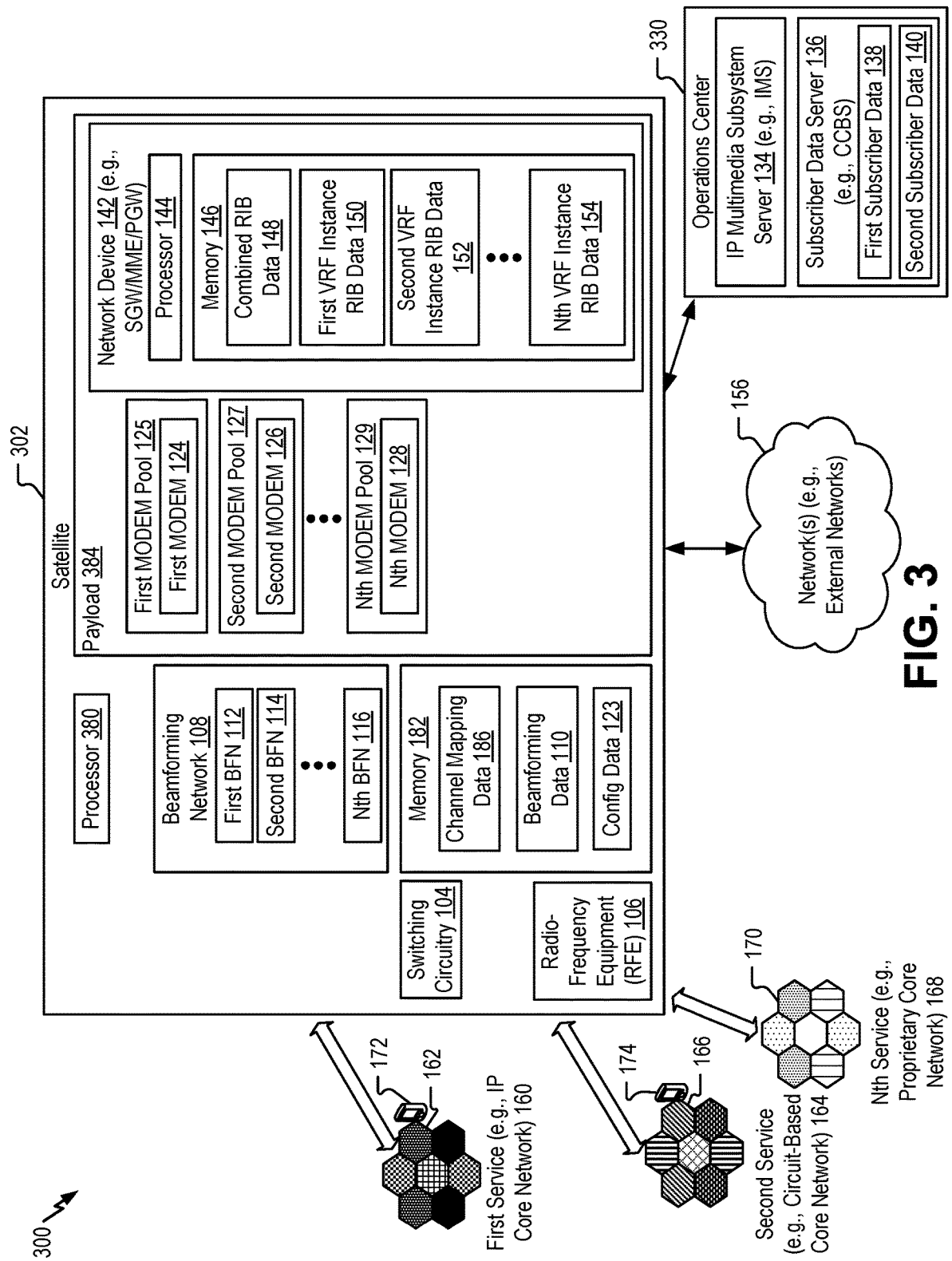
FIG. 3 is a diagram that illustrates a third example of an implementation of a system that processes network traffic associated with different VRF instances corresponding to different pairs of user groups and services.

FIG. 3 illustrates an example of a system 300 configured to process network traffic associated with different VRF instances corresponding to different pairs of user groups and services. The system 300 includes the switching circuitry 104, the RFE 106, the beamforming network 108, the network device 142, the subscriber data server 136, and the IP multimedia subsystem server 134 of FIG. 1. Additionally, the system 300 includes a satellite 302 and an operations center 330. Although components 104, 106, 108, 134, 136, 142, 302, and 330 are illustrated as being included in the system 300, in other implementations, one or more of the components 104, 106, 108, 134, 136, 142, 302, and 330 are not included (and corresponding functions are performed by one or more of the remaining components).

Components 104, 106, 108, 134, 136, 142 are configured to perform the operations described with reference to FIG. 1. As an example, the switching circuitry 104 generates RF signals for transmission to the one or more devices via different RF channels (or other portions of a frequency spectrum) based on the channel mapping data 186, as described with reference to FIG. 1. As another example, the beamforming network 108 adjusts one or more RF signals based on beamforming weights indicated by beamforming data 110 and associated with a particular pair of user group and service to adjust amplitude, phase, etc., of the one or more RF signals, as described with reference to FIG. 1. The RFE 106 is configured to process RF signals that are received at the satellite 302 from or that are to be sent (e.g., transmitted) from the satellite 302 to the one or more devices. The network device 142 is configured to receive data packets from MODEMs and to generate packets to be sent to other devices of the network 156. However, in the implementation illustrated in FIG. 3, the RFE 106 and the network device 142 are integrated within the satellite 302. For example, a payload 384 of the satellite 302 includes the network device 142, the first MODEM pool 125, the second MODEM pool 127, and the Nth MODEM pool 129. To illustrate, each of the first MODEM pool 125, the second MODEM pool 127, and the Nth MODEM pool 129 is instantiated at the payload 384. In some aspects, the implementation illustrated in FIG. 1 is referred to as a "transparent architecture" and the implementation illustrated in FIG. 3 is referred to as a "regenerative architecture." For example, the satellite 102 is configured to process analog RF signals, whereas the satellite 302 is configured to regenerate RF energy into digital MODEM frames that encapsulate network packets. The IP multimedia subsystem server 134 and the subscriber data server 136 are integrated within the operations center 330 (e.g., off the satellite 302). In a particular implementation, one or more operations described with reference to components of the satellite 302 are performed by a processor 380 of the satellite 302.

During operation, the system 300 provides end-to-end network traffic isolation for different pairs of user groups and services, as described with reference to the system 100 of FIG. 1. However, in contrast to the system 100 of FIG. 1, MODEM operations and packet conversion operations (e.g., between data packets corresponding to RF signals and network packets communicated via the network 156) are performed by satellite components. To illustrate, MODEM operations and packet conversion operations are performed by one or more of the first MODEM pool 125, the second MODEM pool 127, and the Nth MODEM pool 129 and the network device 142, respectively, of the payload 384 of the satellite 302.

Figure 4:
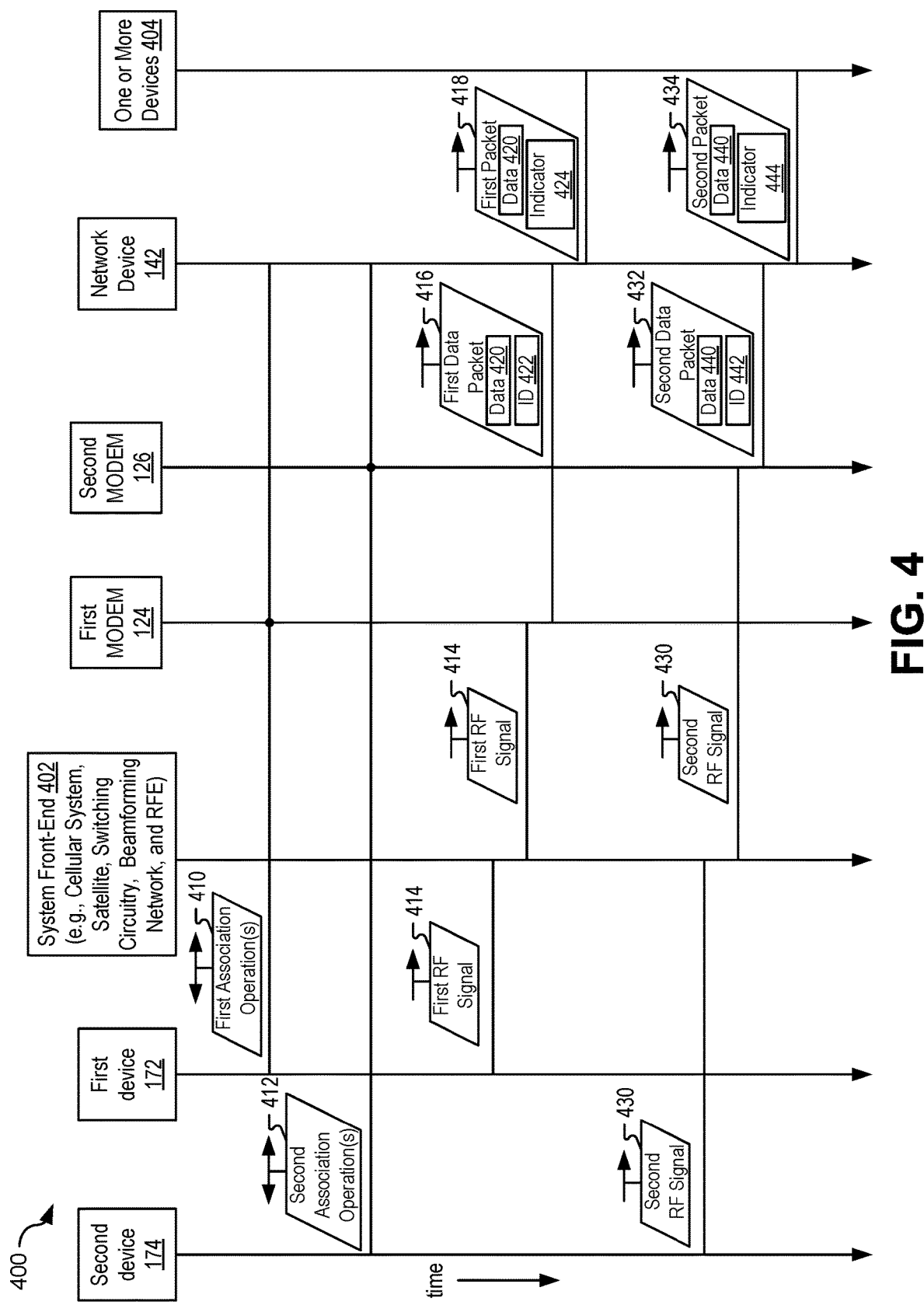
FIG. 4 is a ladder diagram that illustrates a first example of network traffic communicated via the systems of FIGS. 1-3.

FIG. 4 depicts a ladder diagram 400 that illustrates a first example of network traffic communicated via the system 100 of FIG. 1. In a particular implementation, the operations illustrated in FIG. 4 are performed by the first device 172, the second device 174, a system front-end 402, the first MODEM 124, the second MODEM 126, the network device 142, and one or more devices 404. In a particular implementation (e.g., illustrated in FIG. 1), the system front-end 402 refers to the satellite 102, the switching circuitry 104, the RFE 106, the beamforming network 108, or a combination thereof. In a particular implementation (e.g., illustrated in FIG. 2), the system front-end 402 refers to the cellular system 202, the RFE 106, the switching circuitry 204, the beamforming network 206, or a combination thereof. In a particular implementation (e.g., illustrated in FIG. 3), the system front-end 402 refers to the switching circuitry 104, the RFE 106, the beamforming network 108, or a combination thereof.

As depicted in FIG. 4, the first device 172 performs first association operation(s) 410 with the base station 118 (or the satellite 302) and the network device 142 to associate with the system 100 of FIG. 1, the system 200 of FIG. 2, or the system 300 of FIG. 3. The first association operation(s) 410 may include radio link attachment operations, network registration operations, IMS registration operations, or a combination thereof.

In a particular implementation, the first device 172 is associated with the first service 160 (e.g., the first device 172 subscribes to the first service 160 of the first user group), and the first device 172 performs one or more radio link attachment operations in accordance with one or more wireless communication standards, such as a 3rd Generation Partnership Project (3GPP) standard. To illustrate, the first device 172 synchronizes to available operator frequencies and receives master information block (MIB) data and system information block (SIB) data. The MIB data and the SIB data indicate available operators associated with the system 100 (or the system 200) and information used to connect to the system 100 (or the system 200). The first device 172 initiates a random-access channel (RACH) procedure to attach to the network. As part of the RACH procedure, the first device 172 and the base station 118 (or the satellite 302) perform a handshake procedure that results in establishment of a MAC-layer connection between the first device 172 and the first MODEM 124.

In a particular implementation, after the one or more radio link attachment operations, the first device 172 performs one or more network registration operations. In some implementations, the one or more network registration operations are in accordance with one or more wireless standards, such as a 3GPP standard. To illustrate, the first device 172 initiates a handshake procedure with a MME (e.g., the network device 142) to validate and authenticate the identity of the first device 172 and the network, respectively. During the handshake procedure, the MME coordinates with an equipment identity registry (EIR) to validate that the first device 172 is authorized to access the network. The MME and the EIR store and maintain data for each user group and each service for performing handshake procedures. The MME manages a second handshake procedures with the SGW, the PGW, and the base station 118 (or the satellite 302) that results in an allocation of a session (e.g., with the core network 130, such as an evolved packet core (EPC) network) and the establishment of an initial evolved packet system (EPS) bearer to and from the first device 172. The network device 142 (e.g., the MME, the SGW, the PGW) and the base station 118 (or the satellite 302) are configured to store data associated with each user group and each service and to support multi-VRF RIB data and queue structures. Depending on the first service 160 being requested by the first device 172, the network device 142 (e.g., the MME, the SGW, and the PGW) may create additional EPS bearers. Once the one or more radio link attachment operations and the one or more network registration operations are complete, the first device 172 is able to transmit and receive data via the system 100 (or the system 200).

In a particular implementation, after completing the one or more network registration operations, the first device 172 performs one or more IMS registration operations. To illustrate, the first device 172 initiates an IMS registration procedure by transmitting a session initiation protocol (SIP) register messages to the IP multimedia subsystem server 134 of FIG. 1, FIG. 2, or FIG. 3. A proxy-call setup control function (P-CSCF) of the IP multimedia subsystem server 134 receives the SIP register message and triggers handshake procedures between the P-CSCF, an interrogating CSCF (I-CSCF) of the IP multimedia subsystem server 134, and a serving CSCF (S-CSCF) of the IP multimedia subsystem server 134 that validate authorization of the first device 172 to access IMS-based services. The S-CSCF also performs a handshake procedure with a telephony application server (TAS), allowing the TAS to query a home subscriber server database for voice over long term evolution (VoLTE) data associated with the first device 172. The first device 172, the P-CSCF, and the TAS then participate in a handshake procedure to subscribe to a registration event package in order to be made aware of future changes to a registration state associated with the first device 172. The second device 174 performs second association operation(s) 412 with the base station 118 (or the satellite 302) and the network device 142, in a similar manner to the first association operation(s) 410 (except that the second device 174 is associated with the second service 164 and the second user group). The above-described association operations are illustrative and not limiting. In other implementations, one or more other association operations are performed, one or more of the above-described association operations are not performed, or both.

After the first association operation(s) 410 are performed, the first device 172 sends a first RF signal 414 to the system front-end. The system front-end receives the first RF signal 414 and performs initial processing (e.g., amplification, filtering, noise-reduction, etc.) prior to sending the first RF signal 414 to the base station 118 (or the payload 384 of the satellite 302). The first MODEM 124 receives the first RF signal 414 and generates a first data packet 416. The first data packet includes first data 420 (e.g., data indicated by the first RF signal 414) and a first identifier 422. In a particular implementation, the first identifier 422 includes or corresponds to a label. The label includes a switching tag (also referred to as a virtual local area network (VLAN) tag or an 802.1Q tag), a VRF instance identifier, and an open shortest path first (OSPF) process identifier (PID).

The first data packet 416 is sent from the first MODEM 124 to the network device 142. The network device 142 receives the first data packet 416 and generates a first packet 418 based on the first data packet 416. The first packet 418 includes the first data 420 and a first indicator 424. In a particular implementation, the network device 142 is configured to replicate any changes made to per-VRF instance RIB data in the combined RIB data 148 (e.g., also referred to as a backbone RIB or a global VRF instance RIB). To illustrate, the combined RIB data 148 is updated based on updates to the first VRF instance RIB data 150. Additionally, the first identifier 422 is stripped from the first data 420, and the first indicator 424 is included in the first packet 418. The first indicator 424 (e.g., a "per-VRF identifier") indicates a VRF instance associated with the first service 160 and the first user group. In a particular implementation, the first indicator 424 is included in a header of the first packet 418. In some implementations, the first indicator 424 is indicated by a source address or a source port number of the header of the first packet 418. After generation, the first packet 418 is sent to the one or more devices 404 via the core network 130 and the network 156 of FIG. 1 or FIG. 2 or via the network 156 of FIG. 3.

After the second association operation(s) 412 are performed, the second device 174 sends a second RF signal 430 to the system front-end. The system front-end receives the second RF signal 430 and performs initial processing (e.g., amplification, filtering, noise reduction, etc.) prior to sending the second RF signal 430 to the base station 118 (or the payload 384 of the satellite 302). The second MODEM 126 receives the second RF signal 430 and generates a second data packet 432. The second data packet includes second data 440 (e.g., data indicated by the second RF signal 430) and a second identifier 442. In a particular implementation, the second identifier 442 includes or corresponds to a label. The label includes a switching tag, a VRF instance identifier, and an OSPF PID.

The second data packet 432 is sent from the second MODEM 126 to the network device 142. The network device 142 receives the second data packet 432 and generates a second packet 434 based on the second data packet 432. The second packet 434 includes the second data 440 and a second indicator 444. In a particular implementation, the network device 142 is configured to replicate any changes made to per-VRF instance RIB data in the combined RIB data 148. To illustrate, the combined RIB data 148 is updated based on updates to the second VRF instance RIB data 152. Additionally, the second identifier 442 is stripped from the second data 440, and the second indicator 444 is included in the second packet 434. The second indicator 444 indicates a VRF instance associated with the second service 164 and the second user group. In a particular implementation, the second indicator 444 is included in a header of the second packet 434. In some implementations, the second indicator 444 is indicated by a source address or a source port number of the header of the second packet 434. After generation, the second packet 434 is sent to the one or more devices 404 via the core network 130 and the network 156 of FIG. 1 or FIG. 2 or via the network 156 of FIG. 3.

Figure 5:
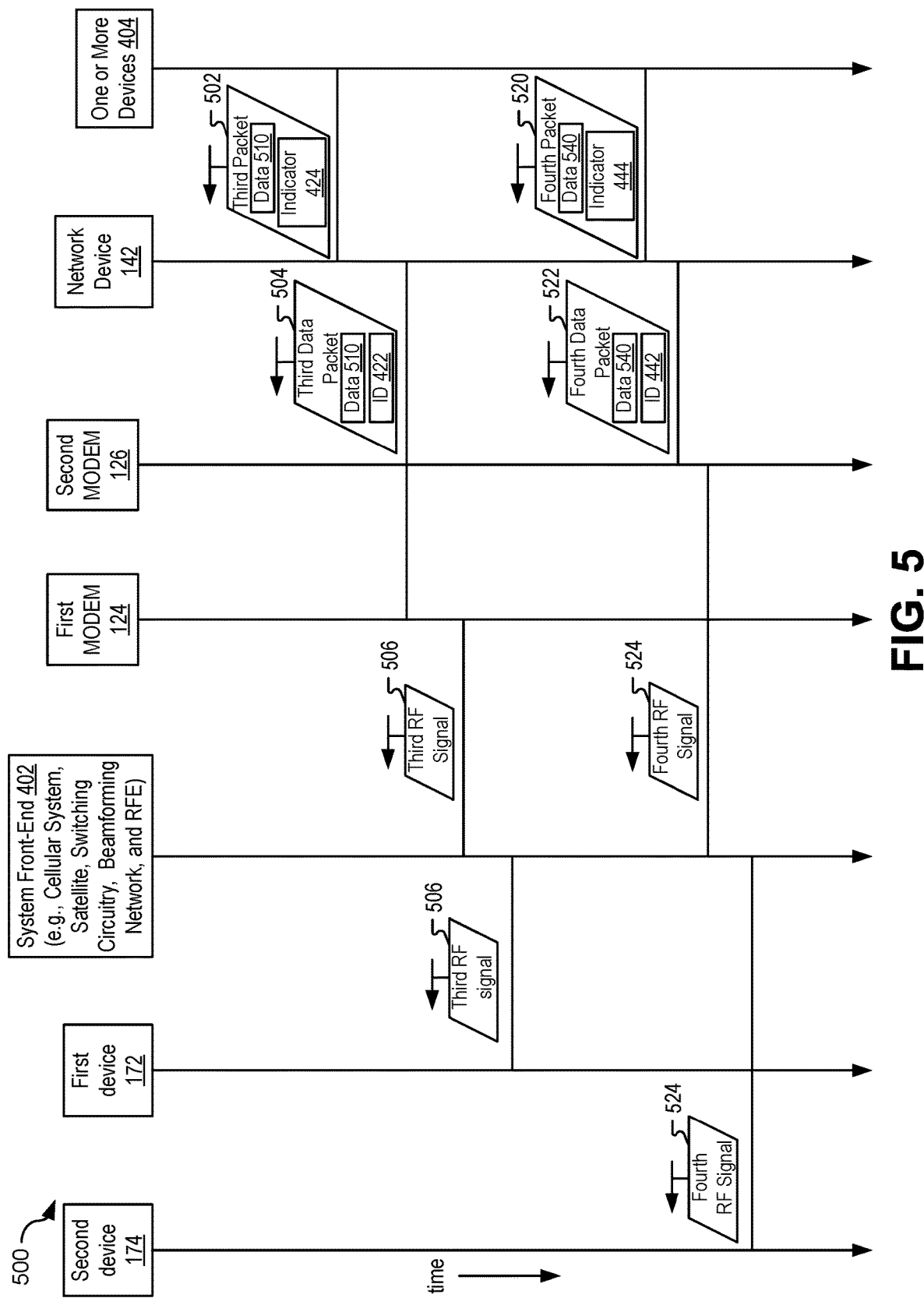
FIG. 5 is a ladder diagram that illustrates a second example of network traffic communicated via the systems of FIGS. 1-3.

FIG. 5 depicts a ladder diagram 500 that illustrates a second example of network traffic communicated via the system 100 of FIG. 1, the system 200 of FIG. 2, or the system 300 of FIG. 3. In a particular implementation, the operations illustrated in FIG. 5 are performed by the first device 172, the second device 174, the system front-end 402, the first MODEM 124, the second MODEM 126, the network device 142, and the one or more devices 404.

As depicted in FIG. 5, the network device 142 receives a third packet 502 from the one or more devices 404. The third packet includes third data 510 and the first indicator 424. The first indicator 424 indicates the VRF instance associated with the first service 160 and the first user group. In a particular implementation, the first indicator 424 is included in a header of the third packet 502. In some implementations, the first indicator 424 is indicated by a source address or a source port number of the header of the third packet 502. In a particular implementation, the network device 142 is configured to update the combined RIB data 148 based on the third packet 502 and to replicate any changes made to the combined RIB data 148 to corresponding per-VRF instance RIB data. To illustrate, the first VRF instance RIB data 150 is updated based on the updates to the combined RIB data 148.

The network device 142 receives the third packet 502 and generates a third data packet 504 based on the third packet 502. The third data packet 504 includes the third data 510 and the first identifier 422. In a particular implementation, the first identifier 422 includes or corresponds to a label. The label includes a switching tag (also referred to as a VLAN tag or an 802.1Q tag), a VRF instance identifier, and an OSPF PID. To illustrate, the first indicator 424 is stripped from the third packet 502, and the third data 510 is encapsulated in the third data packet 504 with the first identifier 422.

The first MODEM 124 receives third data packet 504 and modulates the third data 510 to generate a third RF signal 506. For example, based on the first identifier 422 identifying the first VRF instance (which corresponds to the first service 160 and the first user group), the third data packet 504 is received and processed at the first MODEM 124 (e.g., a MODEM of the first MODEM pool 125 which is associated with the first service 160 and the first user group). The third RF signal 506 represents the third data 510 and is provided by the system front-end 402 for additional processing (e.g., by the RFE 106) and for transmission to the first device 172. In a particular implementation, the third RF signal 506 corresponds to a RF channel (or other portion of a frequency spectrum) that is associated with the first service 160 and the first user group.

The network device 142 also receives a fourth packet 520 from the one or more devices 404. The fourth packet includes fourth data 540 and the second indicator 444. The second indicator 444 indicates the VRF instance associated with the second service 164 and the second user group. In a particular implementation, the second indicator 444 is included in a header of the fourth packet 520. In some implementations, the second indicator 444 is indicated by a source address or a source port number of the header of the fourth packet 520. In a particular implementation, the network device 142 is configured to update the combined RIB data 148 based on the fourth packet 520 and to replicate any changes made to the combined RIB data 148 to corresponding per-VRF instance RIB data. To illustrate, the second VRF instance RIB data 152 is updated based on the updates to the combined RIB data 148.

The network device 142 receives the fourth packet 520 and generates a fourth data packet 522 based on the fourth packet 520. The fourth data packet 522 includes the fourth data 540 and the second identifier 442. In a particular implementation, the second identifier 442 includes or corresponds to a label. The label includes a switching tag (also referred to as a VLAN tag or an 802.1Q tag), a VRF instance identifier, and an OSPF PID. To illustrate, the second indicator 444 is stripped from the fourth packet 520, and the fourth data 540 is encapsulated in the fourth data packet 522 with the second identifier 442.

The second MODEM 126 receives fourth data packet 522 and modulates the fourth data 540 to generate a fourth RF signal 524. For example, based on the second identifier 442 identifying the second VRF instance (which corresponds to the second service 164 and the second user group), the fourth data packet 522 is received and processed at the second MODEM 126 (e.g., a MODEM of the second MODEM pool 127 which is associated with the second service 164 and the second user group). The fourth RF signal 524 represents the fourth data 540 and is provided by the system front-end 402 for additional processing (e.g., by the RFE 106) and for transmission to the second device 174. In a particular implementation, the fourth RF signal 524 corresponds to a RF channel (or other portion of a frequency spectrum) that is associated with the second service 164 and the second user group.

Figure 6:
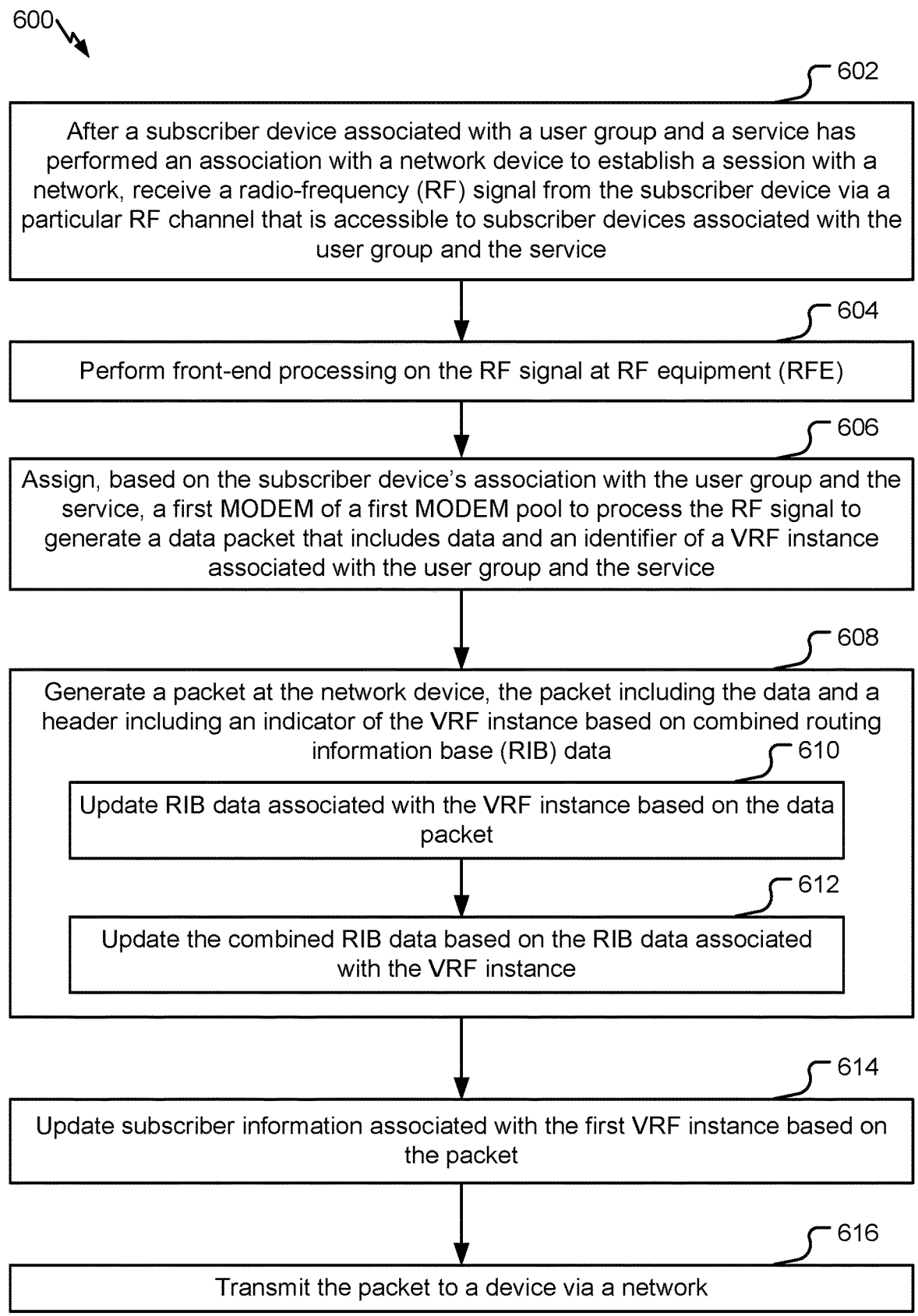
FIG. 6 is a flow chart of an example of a method of processing network traffic received from a device based on a user group and a service associated with the device.

FIG. 6 illustrates a method 600 of processing network traffic received from a device based on a user group and a service associated with the device. In a particular implementation, the method 600 is performed by the system 100 of FIG. 1, the system 200 of FIG. 2, or the system 300 of FIG. 3, as non-limiting examples. The method 600 is described with respect to a particular service (e.g., the first service 160) and a particular user group (e.g., the first user group) for convenience, and such description is not limiting.

The method 600 includes, after a subscriber device (e.g., UE, radio communication terminal) associated with a user group and a service has performed an association with a network device to establish a session with the network, receiving a RF signal from the subscriber device via a particular RF channel that is accessible to subscriber devices associated with the user group and the service, at 602. As a particular example, after the first device 172 has performed an association with the network device 142, the satellite 102 (or the satellite 302) receives an RF signal from the first device 172 via an RF channel associated with the first service 160 and the first user group (e.g., first MVNOs).

The method 600 includes performing front-end processing on the RF signal at RFE, at 604. As a particular example, the RF signal is used to generate a second RF signal (e.g., an RF signal corresponding to a second RF channel that is associated with the first service 160 and the first user group) that is transmitted to the RFE 106, and the RFE 106 performs front-end processing (e.g., amplification, noise reduction, etc.) on the second RF signal.

The method 600 includes assigning, based on the subscriber device's association with the user group and the service, a first MODEM of a first MODEM pool to process the RF signal to generate a data packet that includes data and an identifier of a first VRF instance associated with the user group and the service, at 606. As a particular example, the base station 118 (or the satellite 302) assigns the first MODEM 124 of the first MODEM pool 125 to process the second RF signal based on the second RF signal's association with the first service 160 and the first user group (as indicated by the second RF signal corresponding to the second RF channel, which is associated with the first service 160 and the first user group). After the second RF signal is assigned, the first MODEM 124 generates a first data packet including first data and a first VRF instance identifier that identifies a first VRF instance associated with the first service 160 and the first user group.

The method 600 includes generating a packet at the network device, at 608. The packet includes the data and a header including an indicator of the VRF instance based on combined RIB data. As a particular example, the network device 142 generates a first packet that includes the first data and an indicator (e.g., a label or a 5-tuple, as non-limiting examples) of the first VRF instance associated with the first service 160 and the first user group based on the combined RIB data 148. The method 600 includes updating RIB data associated with the VRF instance based on the data packet, at 610, and updating the combined RIB data based on the RIB data associated with the VRF instance, at 612. As a particular example, prior to generating the packet, the network device 142 updates the first VRF instance RIB data 150 based on the first data packet, and the network device 142 updates the combined RIB data 148 based on updates to the first VRF instance RIB data 150 (or updates to any other VRF-specific RIB data).

The method 600 includes updating subscriber information associated with the first VRF instance based on the packet, at 614. As a particular example, the subscriber data server 136 updates the first subscriber data 138 (e.g., subscriber data associated with the VRF instance corresponding to the first service 160 and the first user group) based on the first packet.

The method 600 further includes transmitting the packet to a device via the network, at 616. As a particular example, the first packet traverses the core network 130, the network 156, or both, to a destination device via a first route. The first route is indicated by the first VRF instance RIB data 150, and the route may be different than a route traversed by packets associated with other VRF instances (and other pairs of user groups and services).

By communicating RF signals for different pairs of user groups and services via different RF channels (e.g., different portions of a frequency spectrum) and by maintaining different VRF instances for the different pairs of user groups and services, the method 600 provides end-to-end network traffic isolation for different pairs of user groups and services. Providing end-to-end network traffic isolation reduces a likelihood that data associated with a particular pair of user group and service is accessible to subscribers of a different pair of user group and service.

Figure 7:
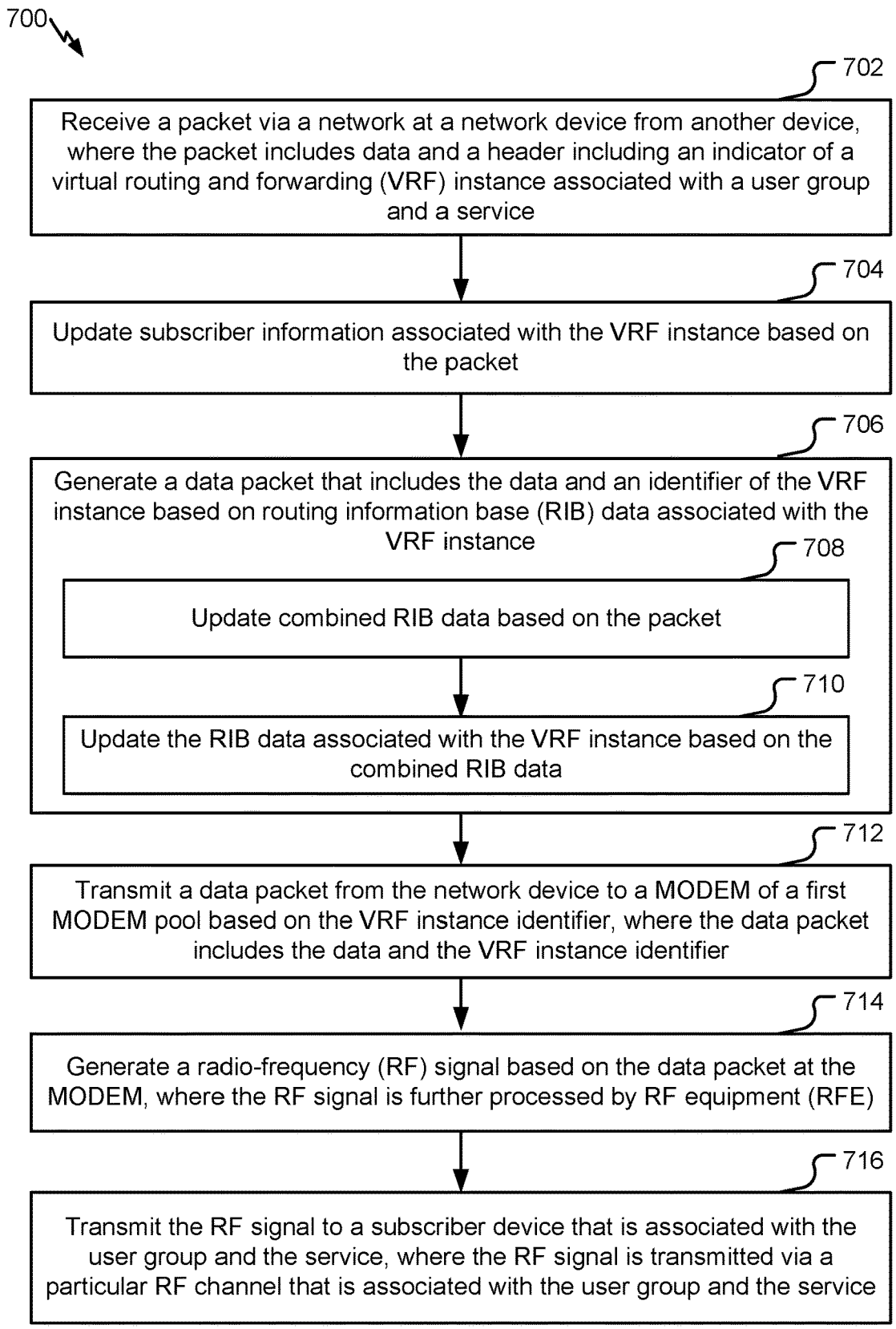
FIG. 7 is a flow chart of an example of a method of processing network traffic to be transmitted to a device based on a user group and a service associated with the device.

FIG. 7 illustrates a method 700 of processing traffic to be transmitted to a device based on a user group and a service associated with the device. In a particular implementation, the method 700 is performed by the system 100 of FIG. 1 the system 200 of FIG. 2, or the system 300 of FIG. 3, as non-limiting examples. In some implementations, the method 700 is performed after performance of the method 600 of FIG. 6 or before performance of the method 600 of FIG. 6. The method 700 is described with respect to a particular service (e.g., the second service 164) and a particular user group (e.g., the second user group) for convenience, and such description is not limiting.

The method 700 includes receiving a packet via a network at a network device from another device, at 702. The packet includes data and a header including an indicator of a VRF instance associated with a user group and a service. As a particular example, the network device 142 receives a second packet from a device via the network 156, the core network 130, or both. The second packet includes second data and a second header that indicates a second indicator of a second VRF instance associated with the second service 164 and the second user group (e.g., second MVNOs).

The method 700 includes updating subscriber information associated with the VRF instance based on the packet, at 704. As a particular example, prior to the network device 142 receiving the second packet, the subscriber data server 136 receives the second packet and updates the second subscriber data 140 based on the second packet.

The method 700 includes generating a data packet that includes the data and an identifier of the VRF instance based on RIB data associated with the VRF instance, at 706. As a particular example, the network device 142 generates a second data packet that includes the second data and a second VRF instance identifier based on the second VRF instance RIB data 152. The method 700 includes updating combined RIB data based on the packet, at 708, and updating the RIB data associated with the VRF instance based on the combined RIB data, at 710. As a particular example, prior to generating the second data packet, the network device 142 updates the combined RIB data 148 based on the second packet, and the network device 142 updates the second VRF instance RIB data 152 based on the update to the combined RIB data 148.

The method 700 includes transmitting a data packet from the network device to a MODEM of a first MODEM pool based on the VRF instance identifier, at 712. The data packet includes the data and the VRF instance identifier. To illustrate, the base station 118 (or the satellite 302) assigns the second MODEM 126 (of the second MODEM pool 127 that is associated with the second service 164 and the second user group) to process the second data packet based on the second data packet including a second VRF instance identifier that corresponds to the second VRF instance (e.g., a VRF instance associated with the second service 164 and the second user group).

The method 700 includes generating a RF signal based on the data packet at the MODEM, at 714. As a particular example, the second MODEM 126 generates a second RF signal based on the second data packet and provides the second RF signal to the RFE 106 for front-end processing (e.g., amplification, filtering, etc.). In a particular implementation, the second MODEM 126 associates the second RF signal with a particular logical interface (or sends the RF signal to a particular port) that is associated with the second service 164 and the second user group.

The method 700 further includes transmitting the RF signal via a particular RF channel to a subscriber device that is associated with the user group and the service, at 716. As a particular example, the satellite 102 (or the payload 384 of the satellite 302) receives the second RF signal from the RFE 106 via a particular RF channel that is associated with the second service 164 and the second user group. Based on the second RF signal being associated with the second service 164 and the second user group, the satellite 102 (or the satellite 302) generates a third RF signal that corresponds to a second RF channel associated with the second service 164 and the second user group and designated for communications between devices and the satellite 102 (or the satellite 302). In a particular implementation, the satellite 102 (or the satellite 302) transmits the third RF signal to the second device 174 via the second RF channel.

By communicating RF signals for different pairs of services and user groups via different RF channels (e.g., different portions of a frequency spectrum) and by maintaining different VRF instances for the different pairs of user groups and services, the method 700 provides end-to-end network traffic isolation for different pairs of user groups and services. Providing end-to-end network traffic isolation reduces a likelihood that data associated with a particular pair of user group and service is accessible to subscribers of a different pair of user group and service.

Figure 8:
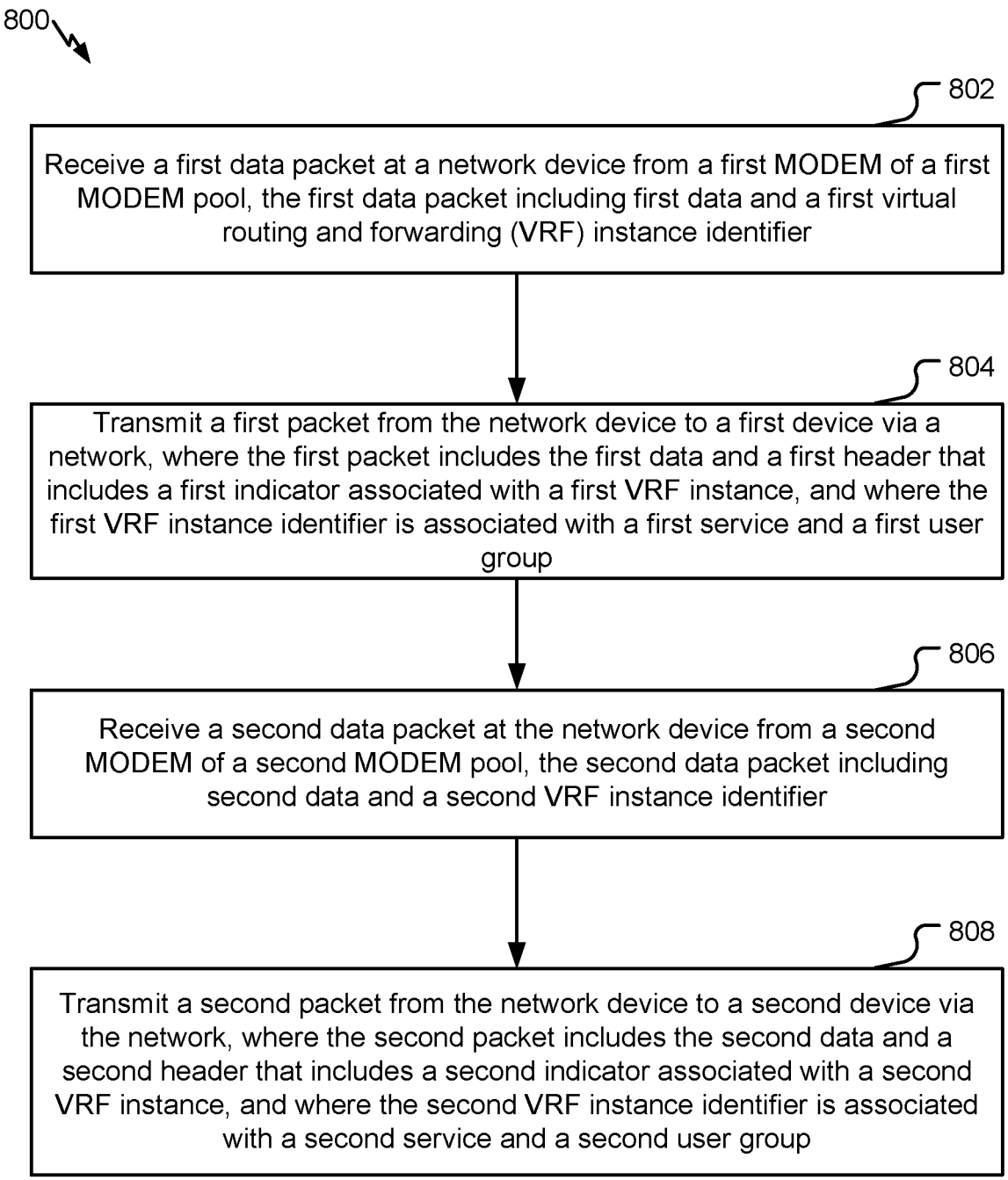
FIG. 8 is a flow chart of an example of a method of processing network traffic associated with different virtual routing and forwarding (VRF) instances corresponding to different pairs of user groups and services.

FIG. 8 illustrates a method 800 of processing network traffic associated with different VRF instances corresponding to different pairs of user groups and services. In a particular implementation, the method 800 is performed by the system 100 of FIG. 1, the system 200 of FIG. 2, or the system 300 of FIG. 3, such as by the network device 142, as a non-limiting example.

The method 800 includes receiving a first data packet at a network device from a first MODEM of a first MODEM pool, at 802. For example, the network device 142 receives the first data packet 416 from the first MODEM 124 of the first MODEM pool 125, as described with reference to FIG. 4. The first data packet 416 includes the first data 420 and the first identifier 422 (e.g., a first VRF instance identifier).

The method 800 includes transmitting a first packet from the network device to a first device via a network, at 804. For example, the network device 142 transmits the first packet 418 via the core network 130, the network 156, or both to the first device 172, as described with reference to FIG. 4. The first packet 418 includes the first data 420 and a first header that includes the first indicator 424 associated with a first VRF instance. The first identifier 422 (e.g., the first VRF instance identifier) is associated with a first service 160 and a first user group. The first identifier 422 (e.g., the first VRF instance identifier) corresponds to (e.g., identifies) the first VRF instance that is associated with the first service 160 and the first user group.

The method 800 includes receiving a second data packet at the network device from a second MODEM of a second MODEM pool, at 806. For example, the network device 142 receives the second data packet 432 from the second MODEM 126 of the second MODEM pool 127, as described with reference to FIG. 4. The second data packet 432 includes the second data 440 and the second identifier 442 (e.g., a second VRF instance identifier).

The method 800 further includes transmitting a second packet from the network device to a second device via the network, at 808. For example, the network device 142 transmits the second packet 434 via the core network 130, the network 156, or both, as described with reference to FIG. 4. The second packet 434 includes the second data 440 and a second header that includes the second indicator 444 associated with a second VRF instance. The second identifier 442 (e.g., the second VRF instance identifier) is associated with a second service 164 and a second user group. The second identifier 442 (e.g., the second VRF instance identifier) corresponds to (e.g., identifies) the second VRF instance that is associated with the second service 164 and the second user group.

In a particular implementation, the method 800 further includes generating first RIB data (e.g., the first VRF instance RIB data 150) associated with the first VRF instance based on the first data packet 416 and generating second RIB data (e.g., the second VRF instance RIB data 152) associated with the second VRF instance based on the second data packet 432. In some implementations, the method 800 further includes generating the combined RIB data 148 (e.g., backbone RIB data) based on the first VRF instance RIB data 150 and the second VRF instance RIB data 152. In some implementations, the first header and the second header are generated based on the combined RIB data.

In another particular implementation, the method 800 further includes logically isolating data associated with the second VRF instance from data associated with the first VRF instance by encapsulating data associated with the first VRF instance using a different header than the data associated with the second VRF instance. As a particular example, data packets generated by the base station 118 (or the satellite 302) and associated with different VRF instances include different VRF instance identifiers (e.g., the first identifier 422 and the second identifier 442 of FIG. 4), and packets generated by the network device 142 and associated with different VRF instances include headers that include different indicators (e.g., the first indicator 424 and the second indicator 444 of FIG. 4).

In another particular implementation, the method 800 further includes updating first subscriber information (e.g., the first subscriber data 138) associated with the first VRF instance based on the first packet 418 and updating second subscriber information (e.g., the second subscriber data 140) associated with the second VRF instance based on the second packet 434.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. For example, one or more of the elements of the method 600 of FIG. 6, one or more of the elements of the method 700 of FIG. 7, one or more of the elements of the method 800 of FIG. 8, or a combination thereof, may be performed in combination with other operations described herein. Accordingly, no single implementation described herein should be construed as limiting and implementations of the disclosure may be suitably combined without departing form the teachings of the disclosure. As an example, one or more operations described with reference to FIGS. 6-8 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system for communication based on services and user groups, the system comprising:
   a plurality of MODEMs corresponding to a plurality of MODEM pools, the plurality of MODEMs comprising:
      a first MODEM corresponding to a first MODEM pool, the first MODEM configured to generate a first data packet based on a first radio-frequency (RF) signal, wherein the first data packet includes first data and a first virtual routing and forwarding (VRF) instance identifier; and
      a second MODEM corresponding to a second MODEM pool, the second MODEM configured to generate a second data packet based on a second RF signal, wherein the second data packet includes second data and a second VRF instance identifier; and
   a network device in communication with the plurality of MODEMs and configured to:
      receive the first data packet and to transmit a first packet to a first device via a network, wherein the first packet includes the first data and a first header that includes a first indicator, the first indicator associated with a first VRF instance that corresponds to the first VRF instance identifier, wherein the first VRF instance identifier is associated with a first service, a first user group, or both; and
      receive the second data packet and to transmit a second packet to a second device via the network, wherein the second packet includes the second data and a second header that includes a second indicator, the second indicator associated with a second VRF instance that corresponds to the second VRF instance identifier, wherein the second VRF instance identifier is associated with a second service, a second user group, or both,
      wherein each of the first MODEM pool, the second MODEM pool, the first VRF instance, and the second VRF instance is instantiated at a payload of a satellite.

2. The system of claim 1, wherein the first service includes at least one of first generation (1G) cellular communication, second-generation (2G) cellular communication, third generation (3G) cellular communication, fourth generation (4G) cellular communication, fifth generation (5G) cellular communication, high speed packet access (HSPA), high speed downlink packet access (HSDPA), high speed uplink packet access (HSDPA), a short message service (SMS), a multimedia message service (MMS), Internet of Things (IoT) communication, Worldwide Interoperability for Microwave Access (WiMax) communication, Institute of Electrical and Electronics Engineers (IEEE) 802.11x communication, Wi-Fi communication, digital video broadcasting satellite (DVB-S) communication, digital video broadcasting-satellite second generation (DVB-S2) communication, DVB-S2 extensions (DVB-S2X) communication, digital video broadcasting-return channel via satellite (DVB-RCS) communication, second generation DVB interactive satellite system (DVB-RCS2) communication, or proprietary government system communication.

3. The system of claim 1, wherein the network device is further configured to:
   receive a third packet from the first device via the network, the third packet including third data and a third header that includes a third indicator, the third indicator associated with the first VRF instance; and
   transmit a third data packet to the first MODEM, the third data packet including the third data and the first VRF instance identifier.

4. The system of claim 3, further comprising a beamforming network configured to adjust a third RF signal based on a first set of beamforming weights associated with the first user group and the first service, wherein the first user group and the first service corresponds to the first VRF instance, and wherein the third RF signal is generated based on the third data packet.

5. The system of claim 1, further comprising radio frequency equipment (RFE) configured to transmit a third RF signal, wherein the third RF signal is based on a third data packet received at the first MODEM from the network device, and wherein the third data packet includes the first VRF instance identifier.

6. The system of claim 5, further comprising switching circuitry configured to generate a plurality of sets of RF signals, each set of RF signals associated with a corresponding portion of a RF spectrum, wherein the plurality of sets of RF signals includes at least one RF signal associated with a particular portion of the RF spectrum that is associated with a user group and a service.

7. The system of claim 6, further comprising a cellular system configured to deploy the plurality of sets of RF signals in an overlay pattern at a first location, wherein the particular portion of the RF spectrum is accessible by devices at the first location and associated with the user group and the service, and is inaccessible by devices that are not associated with the user group and the service.

8. The system of claim 7, wherein the cellular system comprises a satellite-based cellular system or a terrestrial-based cellular system.

9. The system of claim 6, wherein the user group comprises first mobile virtual network operators (MVNOs), and wherein the plurality of MODEMs and the network device are configured to logically isolate traffic associated with the first MVNOs and the service from traffic associated with second MVNOs and another service.

10. The system of claim 1, wherein the plurality of MODEM pools is associated with a plurality of VRF instance identifiers, and wherein each MODEM of the plurality of MODEM pools is configured to process traffic associated with a corresponding VRF instance identifier, wherein the corresponding VRF instance identifier is associated with a service, a user group, or both.

11. The system of claim 1, wherein the first MODEM is further configured to encrypt the first data packet based on a first encryption associated with the first VRF instance, and wherein the second MODEM is further configured to encrypt the second data packet based on a second encryption associated with the second VRF instance.

12. A method comprising:
   receiving a first data packet at a network device from a first MODEM of a first MODEM pool, the first data packet including first data and a first virtual routing and forwarding (VRF) instance identifier;
   transmitting a first packet from the network device to a first device via a network, wherein the first packet includes the first data and a first header that includes a first indicator, wherein the first indicator is associated with a first VRF instance, and wherein the first VRF instance identifier is associated with a first service and a first user group;

receiving a second data packet at the network device from a second MODEM of a second MODEM pool, the second data packet including second data and a second VRF instance identifier; and transmitting a second packet from the network device to a second device via the network, wherein the second packet includes the second data and a second header that includes a second indicator, wherein the second indicator is associated with a second VRF instance, and wherein the second VRF instance identifier is associated with a second service and a second user group, wherein each of the first MODEM pool, the second MODEM pool, the first VRF instance, and the second VRF instance is instantiated at a payload of a satellite.

13. The method of claim 12, wherein the first service includes at least one of first generation (1G) cellular communication, second-generation (2G) cellular communication, third generation (3G) cellular communication, fourth generation (4G) cellular communication, fifth generation (5G) cellular communication, high speed packet access (HSPA), high speed downlink packet access (HSDPA), high speed uplink packet access (HSDPA), a short message service (SMS), a multimedia message service (MMS), Internet of Things (IoT) communication, Worldwide Interoperability for Microwave Access (WiMax) communication, Institute of Electrical and Electronics Engineers (IEEE) 802.11x communication, Wi-Fi communication, digital video broadcasting-satellite (DVB-S) communication, digital video broadcasting-satellite-second generation (DVB-S2) communication, DVB-S2 extensions (DVB-S2X) communication, digital video broadcasting-return channel via satellite (DVB-RCS) communication, second generation DVB interactive satellite system (DVB-RCS2) communication, or proprietary government system communication.

14. The method of claim 12, further comprising:
receiving a third packet at the network device via the network from the first device, the third packet including third data and a third header that includes a third indicator, the third indicator associated with the first VRF instance; and
transmitting a third data packet from the network device to the first MODEM, the third data packet including the third data and the first VRF instance identifier.

15. The method of claim 12, further comprising:
generating, based on the first data packet, first routing information base (RIB) data associated with the first VRF instance; and
generating, based on the second data packet, second RIB data associated with the second VRF instance.

16. The method of claim 15, further comprising generating combined RIB data based on the first RIB data and the second RIB data, wherein the first header and the second header are generated based on the combined RIB data.

17. The method of claim 12, further comprising logically isolating data associated with the second VRF instance from data associated with the first VRF instance by encapsulating data associated with the first VRF instance using a different header than the data associated with the second VRF instance.

18. The method of claim 12, further comprising:
updating first subscriber information associated with the first VRF instance based on the first packet; and
updating second subscriber information associated with the second VRF instance based on the second packet.

19. A network device comprising:
a processor configured to:
receive a first data packet from a first MODEM of a first MODEM pool, the first data packet including first data and a first virtual routing and forwarding (VRF) instance identifier;
transmit a first packet to a first device via a network, wherein the first packet includes the first data and a first header that includes a first indicator, wherein the first indicator is associated with a first VRF instance, and wherein the first VRF instance identifier is associated with a first service and a first user group;
receive a second data packet from a second MODEM of a second MODEM pool, the second data packet including second data and a second VRF instance identifier; and
transmit a second packet from the network device to a second device via the network, wherein the second packet includes the second data and a second header that includes a second indicator, wherein the second indicator is associated with a second VRF instance, and wherein the second VRF instance identifier is associated with a second service and a second user group,
wherein each of the first MODEM pool, the second MODEM pool, the first VRF instance, and the second VRF instance is instantiated at a payload of a satellite.

20. The network device of claim 19, wherein the first service includes at least one of first generation (1G) cellular communication, second-generation (2G) cellular communication, third generation (3G) cellular communication, fourth generation (4G) cellular communication, fifth generation (5G) cellular communication, high speed packet access (HSPA), high speed downlink packet access (HSDPA), high speed uplink packet access (HSDPA), a short message service (SMS), a multimedia message service (MMS), Internet of Things (IoT) communication, Worldwide Interoperability for Microwave Access (WiMax) communication, Institute of Electrical and Electronics Engineers (IEEE) 802.11x communication, Wi-Fi communication, digital video broadcasting-satellite (DVB-S) communication, digital video broadcasting-satellite-second generation (DVB-S2) communication, DVB-S2 extensions (DVB-S2X) communication, digital video broadcasting-return channel via satellite (DVB-RCS) communication, second generation DVB interactive satellite system (DVB-RCS2) communication, or proprietary government system communication.

21. The network device of claim 19, wherein the processor is further configured to:
receive a third packet from the first device via the network, the third packet including third data and a third header that includes a third indicator, the third indicator associated with the first VRF instance; and
transmit a third data packet to the first MODEM, the third data packet including the third data and the first VRF instance identifier.

22. The network device of claim 19, wherein the processor is further configured to:
generate, based on the first data packet, first routing information base (RIB) data associated with the first VRF instance; and
generate, based on the second data packet, second RIB data associated with the second VRF instance.

23. The network device of claim 22, wherein the processor is further configured to generate combined RIB data based on the first RIB data and the second RIB data, wherein the first header and the second header are generated based on the combined RIB data.

* * * * *

UNITED STATES PATENT AND TRADEMARK OFFICE
CERTIFICATE OF CORRECTION

Page 1 of 1

PATENT NO. : 10,965,591 B2
APPLICATION NO. : 16/431061
DATED : March 30, 2021
INVENTOR(S) : James P. Scott and Scott C. Sullivan It is certified that error appears in the above-identified patent and that said Letters Patent is hereby corrected as shown below:

In the Claims

Claim 2, Column 33, Line 55, change:
"(HSDPA)"

To:
--(HSUPA)--

Claim 13, Column 35, Line 25, change:
"(HSDPA)"

To:
--(HSUPA)--

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*